(12) United States Patent
Peterson et al.

(10) Patent No.: US 7,860,774 B1
(45) Date of Patent: Dec. 28, 2010

(54) SYSTEM AND METHOD FOR PROVIDING FINANCIAL ADVICE FOR AN INVESTMENT PORTFOLIO

(75) Inventors: James D. Peterson, Walnut Creek, CA (US); Paul-Charles Archimede Pietranico, San Fancisco, CA (US); Jeremiah Harrison Chafkin, Piedmont, CA (US)

(73) Assignee: Charles Schwab & Co., Inc., San Francisco, CA (US)

( * ) Notice: Subject to any disclaimer, the term of this patent is extended or adjusted under 35 U.S.C. 154(b) by 1369 days.

(21) Appl. No.: 10/698,140

(22) Filed: Oct. 31, 2003

(51) Int. Cl.
 *G06Q 40/00* (2006.01)
(52) U.S. Cl. .................................. 705/36 R
(58) Field of Classification Search ............... 705/36 R
 See application file for complete search history.

(56) References Cited

U.S. PATENT DOCUMENTS

| | | | |
|---|---|---|---|
| 3,634,669 A | 1/1972 | Soumas et al. | 235/184 |
| 3,697,693 A | 10/1972 | Deschenes et al. | 179/2 DP |
| 4,007,355 A | 2/1977 | Moreno | 235/61.7 R |
| 4,334,270 A | 6/1982 | Towers | 364/300 |
| 4,346,442 A | 8/1982 | Musmanno | 364/408 |
| 4,376,978 A | 3/1983 | Musmanno | 364/408 |
| 4,597,046 A | 6/1986 | Musmanno et al. | 346/408 |
| 4,642,767 A | 2/1987 | Lerner | 364/406 |
| 4,648,037 A | 3/1987 | Valentino | 364/408 |
| 4,742,457 A | 5/1988 | Leon et al. | 364/408 |
| 4,752,877 A | 6/1988 | Roberts et al. | 346/408 |
| 4,774,663 A | 9/1988 | Musmanno et al. | 364/408 |
| 4,868,376 A | 9/1989 | Lessin et al. | 235/492 |
| 4,876,648 A | 10/1989 | Lloyd | 364/408 |
| 4,885,685 A | 12/1989 | Wolfberg et al. | 364/401 |
| 4,910,676 A | 3/1990 | Alldredge | 364/408 |
| 4,933,842 A | 6/1990 | Durbin et al. | 364/408 |
| 4,953,085 A | 8/1990 | Atkins | 364/408 |
| 4,989,141 A | 1/1991 | Lyons et al. | 364/408 |
| 5,025,138 A | 6/1991 | Cuervo | 235/379 |
| 5,101,353 A | 3/1992 | Lupien et al. | 364/408 |

(Continued)

FOREIGN PATENT DOCUMENTS

EP 0 572 281 5/1993

(Continued)

OTHER PUBLICATIONS

Nikolov, Christopher, "Selected Issues", Mar 25, 1996, Financial World, p. 32.*

(Continued)

*Primary Examiner*—James A Kramer
*Assistant Examiner*—Eric T Wong
(74) *Attorney, Agent, or Firm*—Townsend and Townsend and Crew, LLP

(57) ABSTRACT

A method in a financial advice system for providing specific recommendations regarding the purchase and sale of specific assets for a client's portfolio. The method can operate to provide specific reasons for each recommended action, and can provide alternative actions for different purchases and sales. Further, the method allows for accounting for specific client preferences and characteristics. The method also provides a sequential approach of inputting client preferences and characteristics and generating a recommended asset allocation taking into account the client's preferences and characteristics. Further, the method can allow for a user to make specific preference indications regarding the purchase and sale of specific assets.

16 Claims, 32 Drawing Sheets

U.S. PATENT DOCUMENTS

| | | | | |
|---|---|---|---|---|
| 5,126,936 | A | * | 6/1992 | Champion et al. .......... 705/36 R |
| 5,132,899 | A | | 7/1992 | Fox ............................. 364/408 |
| 5,148,365 | A | | 9/1992 | Dembo ....................... 364/402 |
| 5,220,500 | A | | 6/1993 | Baird et al. ................. 364/408 |
| 5,222,019 | A | | 6/1993 | Yoshino et al. ............. 364/408 |
| 5,227,967 | A | | 7/1993 | Bailey ........................ 364/408 |
| 5,237,500 | A | | 8/1993 | Perg et al. .................. 364/408 |
| 5,454,104 | A | | 9/1995 | Steidlmayer et al. ........ 395/600 |
| 5,471,575 | A | | 11/1995 | Giansante ................... 395/144 |
| 5,523,942 | A | | 6/1996 | Tyler et al. .................. 364/401 |
| 5,563,783 | A | | 10/1996 | Stolfo et al. ................ 364/408 |
| 5,590,037 | A | | 12/1996 | Ryan et al. .................. 395/204 |
| 5,592,379 | A | | 1/1997 | Finfrock et al. ............. 395/239 |
| 5,644,727 | A | | 7/1997 | Atkins ........................ 395/240 |
| 5,692,233 | A | | 11/1997 | Garman ........................ 705/36 |
| 5,775,734 | A | | 7/1998 | George, Jr. .................. 283/57 |
| 5,784,696 | A | | 7/1998 | Melnikoff ..................... 705/36 |
| 5,812,987 | A | | 9/1998 | Luskin et al. ................. 705/36 |
| 5,864,827 | A | | 1/1999 | Wilson ......................... 705/35 |
| 5,864,828 | A | | 1/1999 | Atkins ......................... 705/36 |
| 5,875,437 | A | | 2/1999 | Atkins ......................... 705/40 |
| 5,884,283 | A | | 3/1999 | Manos ......................... 705/30 |
| 5,884,285 | A | | 3/1999 | Atkins ......................... 705/36 |
| 5,884,287 | A | | 3/1999 | Edesess ....................... 705/36 |
| 5,907,801 | A | | 5/1999 | Albert et al. ................. 455/406 |
| 5,911,135 | A | | 6/1999 | Atkins ......................... 705/36 |
| 5,911,136 | A | | 6/1999 | Atkins ......................... 705/36 |
| 5,918,217 | A | | 6/1999 | Maggioncalda et al. ....... 705/36 |
| 5,918,218 | A | | 6/1999 | Harris et al. .................. 705/37 |
| 6,012,044 | A | | 1/2000 | Maggioncalda et al. ....... 705/36 |
| 6,014,688 | A | | 1/2000 | Venkatraman et al. ...... 709/206 |
| 6,018,722 | A | * | 1/2000 | Ray et al. .................. 705/36 R |
| 6,064,986 | A | | 5/2000 | Edelman ....................... 705/36 |
| 6,076,072 | A | | 6/2000 | Libman ........................ 705/34 |
| 6,085,174 | A | | 7/2000 | Edelman ....................... 705/36 |
| 6,154,732 | A | | 11/2000 | Tarbox ......................... 705/36 |
| 6,202,054 | B1 | | 3/2001 | Lawlor et al. ................. 705/42 |
| 6,223,983 | B1 | | 5/2001 | Kjonaas et al. ............. 235/379 |
| 6,236,980 | B1 | * | 5/2001 | Reese ....................... 705/36 R |
| 6,240,399 | B1 | * | 5/2001 | Frank et al. ............... 705/36 R |
| 6,292,787 | B1 | | 9/2001 | Scott et al. ................... 705/36 |
| 6,304,897 | B1 | | 10/2001 | Venkatraman et al. ...... 709/206 |
| 6,367,010 | B1 | | 4/2002 | Venkatram et al. .......... 713/171 |
| 6,601,044 | B1 | * | 7/2003 | Wallman .................. 705/36 R |
| 6,832,209 | B1 | * | 12/2004 | Karp et al. ................. 705/36 T |
| 7,149,713 | B2 | * | 12/2006 | Bove et al. ................ 705/36 R |
| 7,249,080 | B1 | * | 7/2007 | Hoffman et al. .......... 705/36 R |
| 2002/0062273 | A1 | * | 5/2002 | Perkel et al. .................. 705/37 |
| 2002/0095362 | A1 | * | 7/2002 | Masand et al. ................ 705/35 |
| 2002/0147671 | A1 | * | 10/2002 | Sloan et al. ................... 705/36 |
| 2005/0027632 | A1 | * | 2/2005 | Zeitoun et al. ................ 705/36 |

FOREIGN PATENT DOCUMENTS

| | | |
|---|---|---|
| WO | WO 96/06402 | 2/1996 |
| WO | WO 98/13776 | 4/1998 |
| WO | WO 98/44444 | 10/1998 |
| WO | WO 98/49643 | 11/1998 |
| WO | WO 99/34286 | 7/1999 |
| WO | WO 00/46729 | 8/2000 |
| WO | WO 01/03367 A1 | 1/2001 |
| WO | WO 01/78491 A2 | 10/2001 |
| WO | WO 01/78491 A3 | 10/2001 |

OTHER PUBLICATIONS

Kaplan, Paul D., "Asset Allocation Models Using the Markowitz Approach", Jan. 1998.*
J. Zweig, "12 Deadly Fund Myths—and how to profit from them," *Money*, Feb. 1996, pp. 86-95.
J. Zweig, "What you can do to stop index funds from blowing up on you when stocks fall," *Money*, Sep. 1997, p. 47.
J. Zweig, "How to Build . . . " *Money*, Forecast 1997, pp. 82, 84, 85, 86, 88, 91, 93, & 95.
J. Zweig, "How to Beat 77% of Fund Investors Year After Year," *Money*, Aug. 1997, pp. 136-139.
*Business Week*, Section: Science & Technology "A Financial Planner with Nerves of Silicon," Oct. 7, 1985, p. 108.
M. Edesess et al., "Scenario forecasting: Necessity, not choice," *The Journal of Portfolio Management*, Spring 1980, pp. 10-15.
T. Eggenschwiler et al., "ET++SwapsManager: Using Object Technology in the Financial Engineering Domain," *ACM Sigplan Notices*, vol. 27, No. 10, Oct. 1992, pp. 166-177.
H.F. Weiss, "Dialing for Profits," *Personal Computing*, vol. 10, No. 5, May 1986, pp. cover, 3 and 180.
B. Putnam, "Asset allocation—one step at a time," *Global Investor*, Mar. 1997, pp. 67-72.
F. Hickox, "Learning about artificial intelligence," *Institutional Investor*, Jul. 1986, pp. 209-210.
D.L. Jensen et al., "Frontier: A graphical interface for portfolio optimization in a piecewise linear-quadratic risk framework," *IBM Systems Journal*, vol. 31, No. 1, 1992, pp. 62-70.
J. Keyes, "Expert Allocator: Tools for portfolio optimization," *Pension Management*, vol. 32, No. 5, May 1996, 5 pages in length.
A.J. King, "Asymmetric risk measures and tracking models for portfolio optimization under uncertainty," *Annals of Operations Research*, vol. 45, 1993, pp. 165-177.
M. Malliaris et al., "Beating the Best: A Neural Network Challenges the Black-Scholes Formula," *IEEE Computer Society Press*, CA, 1993, pp. 445-449.
C. Nikolopoulos, "A Hybrid Expert System for Investment Advising," *IEEE*, published Jun. 27, 1994, pp. 1818-1820.
I. Schmerken, "Making Risk Analysis Easy as Alpha, Beta," *Wall Street Computer Review*, Jan. 1988, vol. 5, No. 4, pp. 8 12.
W.F. Sharpe, "Asset allocation: Management style and performance measurement," *The Journal of Portfolio Management*, Winter 1992, pp. 7-19.
W.F. Sharpe et al., *Investments*, Chapters 8, 11 and 23, 5th Edition, 1995, pp. 193-231, 293-321, and 827-863.
H. Tanaka et al., "Possibility Portfolio Selection," *IEEE*, Publication date Mar. 20, 1995, pp. 813-818.
"Keeping Up with Technology: The 1991 Software Update," *Trusts & Estates*, vol. 130, No. 6, Jun. 1991, beginning at p. 34 (15 duplexed pages in length).
J. Vörös "Portfolio analysis—An analytic derivation of the efficient portfolio frontier," *European Journal of Operational Research*, vol. 23, 1986, pp. 294-300.
Wall Street Computer Review, "1990 Buyer's Guide," *Wall Street Computer Review*, 1990, 23 pages in length.
J. Paroush, "Risk and Wealth Effects on Efficient Portfolio," *Metroeconomics*, vol. 26, No. 1-3, 1974, pp. 86-96.
K.N. Pantazopoulos et al., "A Knowledge Based System for Evaluation of Option Pricing Algorithms," Publication date Mar. 29, 1998, pp. 123-140.
L. Bellity, "Optimisation Floue Appliquee Au Choix De Portefeuilles," *CCF Recherche & Innovation*, 1994, 8 pages in length.
Ibbotson Associates, *EnCorr*, 1998, 48 pages in length.
Ibbotson Associates, "InterFace Institutional Software + Data," 2nd Quarter 1998, vol. Issue 5.2, No. 2, 3 pp. in length.
Barra, Inc., "BARRA Provides Combined Style Analysis and asset Allocation Capabilities," *BARRA Portfolio*, 9 pages in length.
Investment Strategies Network, Inc., "Net Results, Your on-line financial advisor," 1995-1997, 97 pages in length.
PCT/US, "International Search Report—PCT/US 98/19920," 3 pages in length.
PCT/US, "International Search Report—PCT/US 98/19951," 3 pages in length.
PCT/US, "International Search Report— PCT/US 98/19952," 3 pages in length.
PCT/US, "International Search Report—PCT/US 98/20709," 3 pages in length.

\* cited by examiner

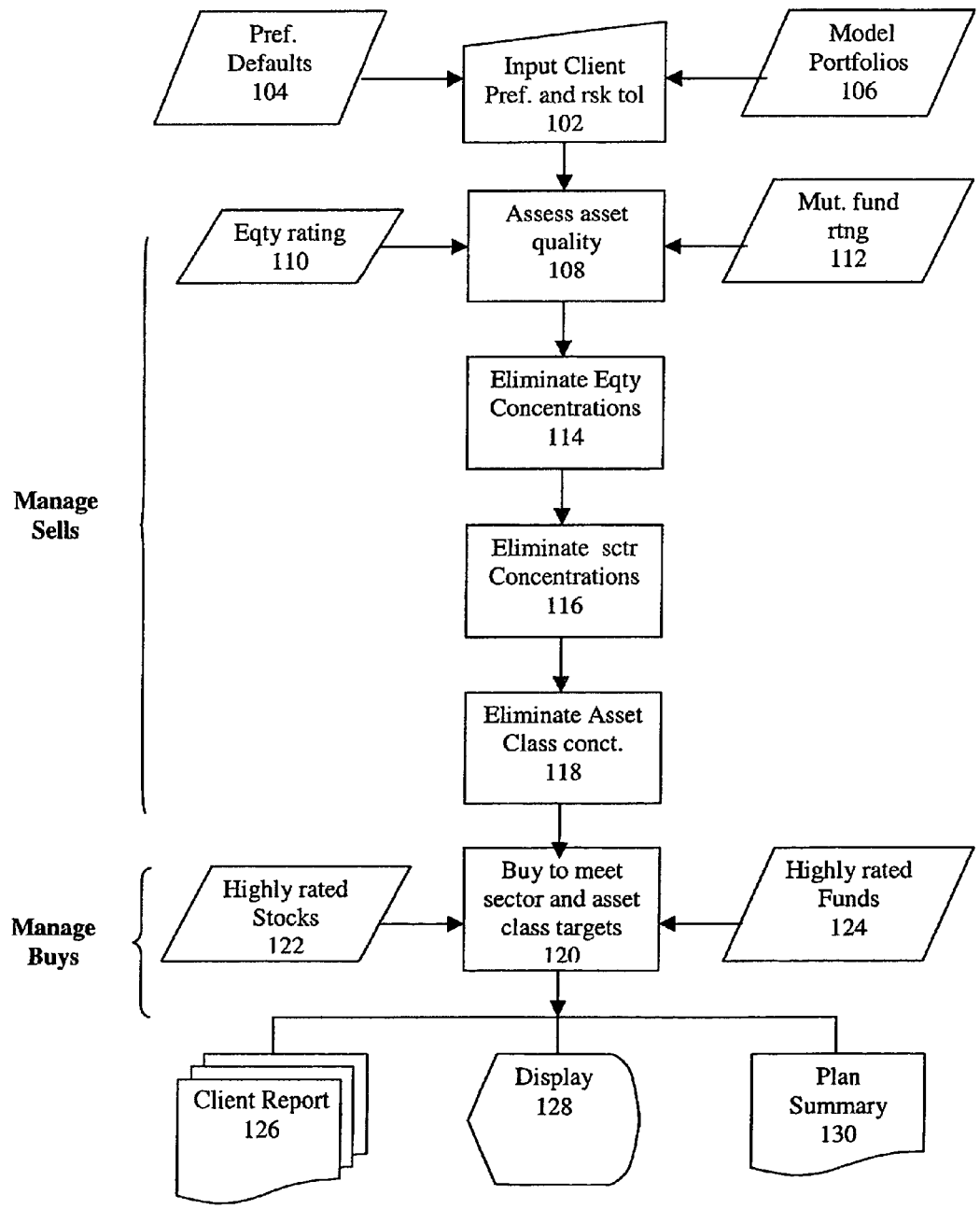

Client Preferences Summary

Customer Profile:
John Doe — 302
Risk Profile: Aggressive
306 Total Cash 304
$35,681.00

1. IND RETIRE ACCT 43914463
   Cash Available: $35,681
2. SCHWAB ONE ACCT 43914462
   Cash Available: $0
3. SCHWAB ONE ACCT

Plan Status:
Symbol   Class   Amt

Allocation Status 307

Print Queue: [pick report]
Current Holdings

Create a New Plan

▶ QuickView | ▶ Asset Allocation | ▶ Cash Flow | ▼ Rebalancing | ▶ Retirement Plan
▼ Step 1: Set Preferences | ▶ Step 2: Manage Sells | ▶ Step 3: Manage Buys | ▶ Review Plan Get Help on:
• Rebalancing Wizard
• Advice Suite 305
Client Preferences Summary

Reset Preferences to Defaults    [Create a One-Step Plan]    [Save & Continue >>]
314
Below is a summary of the current preferences. You can edit any of the preferences by clicking on the "Edit" link for the appropriate section. 310

Sector Preferences Edit

| Sector: | Wilshire % Allocation | Preferred % Allocation | Current # of Stocks | Preferred # of Stocks |
|---|---|---|---|---|
| Consumer Discretionary | 10% | 10% | 2 | 4 |
| Consumer Staples | 10% | 10% | 3 | 2 |
| Energy | 10% | 10% | 2 | 4 |
| Financials | 10% | 10% | 3 | 2 |
| Health Care | 10% | 10% | 2 | 4 |
| Industrials | 10% | 10% | 3 | 2 |
| Information Technology | 10% | 10% | 2 | 4 |
| Materials | 10% | 10% | 3 | 2 |
| Telecom. Services | 10% | 10% | 2 | 4 |
| Utilities | 10% | 10% | 3 | 2 |

Asset Allocation Preferences Edit 308

| Asset Class: | Model % | Preferred % |
|---|---|---|
| Large Cap: | 35% | 35% |
| Small Cap: | 20% | 20% |
| International: | 15% | 15% |
| Fixed Income: | 20% | 20% |
| Cash: | 10% | 10% |
| Other: | 0% | 0% |

312

Sell Preferences Edit
320

| Sell Small Holdings: | <1% of Portfolio ($2,245) — 322 |
| Maximum Equity Concentration: | 15% of Portfolio — 324 |
| Do Not Recommend Trades In: | Account #1234-5678 — 326 |
| Do Not Sell: | Account #1234-5670: AAAA - 200 Shares<br>Account #1234-5679: ABC - $10,000 | DCTM - All | XYZ - All — 328 |
| Force Sell: | Account #1234-5670: XYZ - $10,000 — 330 |
| Do Not Spend: | Account #1234-5670: $25,000 cash | $20,000 6MO CD — 332 |

318

Buy Preferences Edit
336 — Cash to Set Aside from Portfolio: $0
338 — Security Type by Asset Class:
Below are the current preferences for the percentage of available cash that will be spent on each security type during the Recommended Buying process.

340 — Large Cap

| Security Type | Preferred Allocation |
|---|---|
| Actively Managed Mutual Funds | 0% |
| Index Funds | 100% |
| Individual Equities | 0% |
| Total (must equal 100%): | 100% |

| Managed Accts: $100,000 | Growth<br>Schwab Personal Portfolio |
| Other Investments: | $0 |

344 Small Cap

| Security Type | Preferred Allocation |
|---|---|
| Actively Managed Mutual Funds | 0% |
| Index Funds | 100% |
| Individual Equities | 0% |
| Total (must equal 100%): | 100% |

| Managed Accts: $0 | N/A |
| Other Investments: | $50,000 |

342 — International

| Security Type | Preferred Allocation |
|---|---|
| Actively Managed Mutual Funds | 0% |
| Index Funds | 100% |
| Individual Equities** | 0% |
| Total (must equal 100%): | 100% |

| Managed Accts: $0 | N/A |
| Other Investments: | $0 |

346 Fixed Income

| Security Type | Preferred Allocation |
|---|---|
| Actively Managed Mutual Funds | 0% — 360 |
| Index Funds | 100% — 362 |
| Individual Bonds** | 0% — 364 |
| Total (must equal 100%): | 100% |

| Managed Accts: $0 | N/A — 366 |
| Other Investments: | $0 — 368 |
| State Marginal Tax Rate | 6% — 370 |
| Federal Marginal Tax Rate | 32% — 372 |
| Only Buy Tax Exempt Funds | ☐ — 374 |

348, 350, 352, 354, 356, 358

334

** The Rebalancing Wizard will not recommend International Equities or Individual Bonds. If you want to buy Individual International Equities or Individual Bonds, allocate "Cash for other Purchases" for these securities and add them manually at the end of the process.

Reset Preferences to Defaults    [Create a One-Step Plan]    [Save & Continue >>]
                                         376                 378

FIG. 3

| Customer Profile: |
| --- |
| DAVID ABBOTT |
| Portfolio Name: |
| Schwab |
| Risk Profile: |
| Moderate |
| Total Cash Available for Rebalancing |
| $110,325.66 |
| 1. IND RETIRE ACCT 10054109 |
| Cash Available: $10,326 |
| 2. OSH 1 |
| Cash Available: $100,000 |

| ▶ QuickView | ▶ Asset Allocation | ▶ Cash Flow | ▼ Rebalancing | ▶ Retirement Plan |
| --- | --- | --- | --- | --- |

▼ Step 1: Set Preferences | ▶ Step 2: Manage Sells | ▶ Step 3: Manage Buys | ▶ Review Plan

Get Help on:
- Rebalancing Wizard
- Advice Suite

Edit Asset Allocation Preferences

You can edit the client's preferred asset allocation below. The Rebalancing Wizard will use the percentages entered as targets for this rebalancing plan. Changes made to the asset allocation in the Rebalancing Wizard will NOT affect the risk tolerance or asset allocation for this portfolio in other AdviceSuite applications.

Asset Allocation — 402

400

| Asset Class: | Model % | Preferred % |
| --- | --- | --- |
| Large Cap Equity | 30.0% | 35.0 % — 404 |
| Small Cap Equity | 15.0% | 15.0 % — 406 |
| International Equity | 15.0% | 15.0 % — 408 |
| Fixed Income | 30.0% | 30.0 % — 410 |
| Cash or Equivalent | 10.0% | 5.0 % — 412 |
| Other | 0.0% | 0.0 % — 414 |
| Total: | | 100 |

Reset

Save Changes to Preferences

| Print Queue: | [pick report] |
| --- | --- |
| 1 Current Holdings | |

Edit Sector Allocation Preferences

You can edit the client's preferred sector allocation below. The Rebalancing Wizard will use the percentages entered as targets for this rebalancing plan. Changes to the sector allocation made in the Rebalancing Wizard will NOT affect the sector allocation for this portfolio in other AdviceSuite applications.

Sector Preferences

416

| Sector: | Wilshire % Allocation | Preferred % Allocation | Current # of Stocks | Preferred # of Stocks |
|---|---|---|---|---|
| Consumer Discretionary | 10% ~436 | 10 % | 2 | 4 |
| Consumer Staples | 10% ~438 | 10 % | 3 | 4 |
| Energy | 10% ~420 | 10 % | 2 | 4 |
| Financials | 10% ~422 | 10 % | 3 | 4 |
| Health Care | 10% ~424 | 10 % | 2 | 4 |
| Industrials | 10% ~426 | 10 % | 3 | 4 |
| Information Technology | 10% ~428 | 10 % | 2 | 4 |
| Materials | 10% ~430 | 10 % | 3 | 4 |
| Telecom. Services | 10% ~432 | 10 % | 2 | 4 |
| Utilities | 10% ~434 | 10 % | 3 | 4 |
| Total: | | 100 % | Total: | 40 |

418

Customer Profile:
John Doe
Risk Profile: Aggressive

Total Cash
$35,681.00

1. IND RETIRE ACCT 43914463
   Cash Available: $35,681
2. SCHWAB ONE ACCT 43914462
   Cash Available: $0
3. SCHWAB ONE ACCT

Plan Status:
Symbol   Class   Amt

Print Queue: [nick report]
1 Current Holdings

Got Help on:
- Rebalancing Wizard
- Advice Suite

QuickView | Asset Allocation | Cash Flow | Rebalancing | Retirement Plan
Step 1: Set Preferences | Step 2: Manage Sells | Step 3: Manage Buys | Review Plan Reset Save Changes to Preferences

Edit Buy Preferences

Customer Profile: DAVID ABBOTT
Portfolio Name: Schwab
Risk Profile: Moderate
Total Cash Available for Rebalancing: $110,325.66
1. IND RETIRE ACCT 10054109  Cash Available: $10,326
2. OSH1  Cash Available: $100,000

Print Queue: [Pick to Print]
1 Current Holdings

> QuickView | > Asset Allocation | > Cash Flow | > Rebalancing | > Retirement Plan
▼ Step 1: Set Preferences | ▼ Step 2: Manage Sells | ▼ Step 3: Manage Buys | ▼ Review Plan

Got Help on:
- Rebalancing Wizard
- Advice Suite

Reset

You can specify an amount of cash to set-aside from the rebalancing analysis. If, for example the client has short-term need for this cash. You can also specify the target allocation percentages for each security type across each asset class.

Cash Preferences
Cash to be Set Aside from Portfolio: (this will not be considered in the portfolio's allocation)  $[  0  ]

Save Changes to Preferences

Buy Preferences for Available Cash

Security Type by Asset Class:
Below are the target allocation percentages for each security type across each asset class.

| Large Cap | |
|---|---|
| Security Type | Preferred Allocation |
| Actively Managed Mutual Funds | 25 % — 466 |
| Index Funds | 75 % — 468 |
| Individual Equities | 0 % — 470 |
| Total (must equal 100%): | 100 % |

| Small Cap | |
|---|---|
| Security Type | Preferred Allocation |
| Actively Managed Mutual Funds | 50 % |
| Index Funds | 50 % |
| Individual Equities | 0 % |
| Total (must equal 100%): | 100 % |

| International | |
|---|---|
| Security Type | Preferred Allocation |
| Actively Managed Mutual Funds | 75 % |
| Index Funds | 25 % |
| Individual Equities** | 0 % |
| Total (must equal 100%): | 100 % |

| Fixed Income | |
|---|---|
| Security Type | Preferred Allocation |
| Actively Managed Mutual Funds | 100 % |
| Index Funds | 0 % |
| Individual Bonds** | 0 % |
| Total (must equal 100%): | 100 % |
| State Marginal Tax Rate | 0.00 |
| Federal Marginal Tax Rate | 0.00 |
| Only Buy Tax Exempt Funds | ☐ |

**The Rebalancing Wizard will not recommend international equities or individual bonds. If you want to buy individual international equities or individual bonds, you may manually do so.

Reset

Save Changes to Preferences 464   462

| Customer Profile: | |
|---|---|
| John Doe | |
| Risk Profile: Aggressive | |
| Total Cash $35,681.00 | |
| 1. IND RETIRE ACCT 43914463 Cash Available: $35,681 | |
| 2. SCHWAB ONE ACCT 43914462 Cash Available: $0 | |
| 3. SCHWAB ONE ACCT | |

Plan Status:
Symbol | Class | Amt
Sell Recommendations
INTC | LC | $8,042
CSCO | LC | $724
Buy Recommendations Allocation Status Print Queue:
1. Current Holdings Create a New Plan ▶ QuickView  ▶ Asset Allocation  ▶ Cash Flow  ▶ Rebalancing  ▶ Retirement Plan
▶ Step 1: Set Preferences  ▼ Step 2: Manage Sells  ▶ Step 3: Manage Buys  ▶ Review Plan Got Help on:
• Rebalancing Wizard
• Advice Suite

Recommended Sells Summary — 914

Below is a list of all of the sell recommendations that you have included in your plan. You can edit the quantities of your sell recommendations here, or if you are satisfied, move on to the Recommended Buys process. You will be able to manually edit all of the recommendations in your plan at the completion of the Manage Buys process.

Continue to Manage Buys >>

902

Sells Recommended Due To Poor Ratings — 910

Edit All Sells Recommendations

| Remove | Symbol | Sell Qty/Amt. | Acct. # (Type) | Shares/ Position Value | Asset Class | % of Asset Class | Category | Style | Rating | Edit |
|---|---|---|---|---|---|---|---|---|---|---|
| ☐ | ABC | 2,000 | 123456789 (taxable) | 2,000/ $20,000 | Large Cap | xx% | xxxxxx | Growth | D | Edit |
| ☐ | DEF | 2,000 | 123456789 (taxable) | 2,000/ $20,000 | Large Cap | xx% | xxxxxx | Growth | D | Edit |
| ☐ | GHIJK | 12,000 | 123456789 (taxable) | 1,000/ $12,000 | Small Cap | xx% | xxxxxx | Growth | F | Edit |

916

Sells Recommended Due To Equity Concentration

| Remove | Symbol | Sell Qty/Amt. | Acct. # (Type) | Shares/ Position Value | Asset Class | % of Asset Class | Category | Style | Rating | Edit |
|---|---|---|---|---|---|---|---|---|---|---|
| ☐ | EEE | 2,000 | 123456789 (Company Retirement Acct.) | 2,000/ $20,000 | Large Cap | xx% | xxxxxx | Growth | B | Edit |
| ☐ | FFFF | 2,000 | 123456780 (taxable) | 2,000/ $20,000 | Large Cap | xx% | xxxxxx | Growth | C | Edit |

918

Sells Recommended Due To Sector Concentration

| Remove | Symbol | Sell Qty/Amt. | Acct. # (Type) | Shares/ Position Value | Asset Class | % of Asset Class | Category | Style | Rating | Edit |
|---|---|---|---|---|---|---|---|---|---|---|
| ☐ | AAA | 2,000 | 123456789 (taxable) | 2,000/ $20,000 | Large Cap | xx% | Technology | Growth | B | Edit |
| ☐ | BBB | 1,000 | 123456780 (401K) | 1,000/ $10,000 | Large Cap | xx% | Health | Growth | C | Edit |

920

Sells Recommended Due To Asset Class Concentration

| Remove | Symbol | Sell Qty/Amt. | Acct. # (Type) | Shares/ Position Value | Asset Class | % of Asset Class | Category | Style | Rating | Edit |
|---|---|---|---|---|---|---|---|---|---|---|
| ☐ | XYZ | 2,000 | 123456789 (taxable) | 2,000/ $20,000 | Large Cap | xx% | Technology | Growth | B | Edit |
| ☐ | TUVX | 1,000 | 123456780 (401K) | 1,000/ $10,000 | Large Cap | xx% | Health | Growth | C | Edit |

Continue to Manage Buys >>

Customer Profile:
DAVID ABBOTT
Portfolio Name:
Schwab
Risk Profile:
Moderate
Total Cash Available for Rebalancing
($201,971.22)
1. IND RETIRE ACCT 10054109
   Cash Available: ($327,975)
2. OSH 1
   Cash Available: $126,004

| ▶ QuickView | ▶ Asset Allocation | ▶ Cash Flow | ▼ Rebalancing | ▶ Retirement Plan |
|---|---|---|---|---|
| ▶ Step 1: Set Preferences | ▶ Step 2: Manage Sells | ▼ Step 3: Manage Buys | ▶ Review Plan | |

Get Help on:
• Rebalancing Wizard
• Advice Suite

Recommended Buys: Fixed Income

Reset

You can accept, modify, or remove any of the following recommendations from the Rebalancing Plan, and select from the list of available "Alternates".

Save & Continue »

Expand All | Collapse All
Fixed Income Buy Recommendations

Total Fixed Income Buying Allocation = $47,300

Actively Managed Mutual Funds ○ Total Fixed Income/Actively Managed Mutual Funds Buying Allocation = $47,300

| Remove | Symbol | Buy Qty/Amt. | Acct. # (Type) | Share Price | Asset Class | Category | Style | Rating |
|---|---|---|---|---|---|---|---|---|
| ☐ | RSGVX | ⊙ Qty ○ Amt  5.000 | 10054109 (IRA) | $9.46 | Fixed Income | N/A | N/A | |

This will be an explanation of the reason for the recommendation. More details may be available via this link.

▶ Alternates:

Rebalancing Status
Rebalancing Plan:
1202

| Symbol | Class | $ Amt |
|---|---|---|
| Sell Trades | | |
| ABT | LC | $15,440 |
| AM2 | SC | $1,452 |
| AMZN | LC | $97,350 |
| AZO | SC | $8,058 |
| CSX | SC | $12,212 |
| DH | SC | $7,680 |
| GE | LC | $2,768 |
| HDI | LC | $18,200 |
| IBM | LC | $4,601 |
| INTC | LC | $63,800 |

Required fields are marked with an *

Individual Bonds ○ Total Fixed Income/Individual Bonds Buying Allocation = $

| Symbol* | Name | Buy Qty/Amt.* | Acct. # (Type)* |
|---|---|---|---|
| | | ○ Qty ○ Amt | 1234-5678 (tax-deferred) |
| | | ○ Qty ○ Amt | 1234-5678 (tax-deferred) |

Add more Individual Bonds

1204

Print Queue: [pick report]
1 Current Holdings

Reset

Save & Continue »

Create New Plan

Customer Profile:
DAVID ABBOTT
Portfolio Name:
Schwab
Risk Profile:
Moderate
Total Cash Available for Rebalancing
$161,296.14
1. IND RETIRE ACCT 10054109
   Cash Available: $35,292
2. OSH 1
   Cash Available: $126,004

Rebalancing Plan:
| Symbol | Class | $ Amt |
|---|---|---|
| ABT | LC | $15,440 |
| AMD | SC | $1,452 |
| AMZN | LC | $97,350 |
| AZO | SC | $8,058 |
| BA | LC | $31,910 |
| CSX | SC | $12,212 |
| DRI | LC | $7,680 |
| GE | LC | $22,144 |
| GE | LC | $2,768 |
| GIS | LC | $18,200 |

Print Queue: [Rick (error)]
1. Current Holdings

▸ QuickView | ▸ Asset Allocation | ▸ Cash Flow | ▼ Rebalancing | ▸ Retirement Plan
▸ Step 1: Set Preferences | ▸ Step 2: Manage Sells | ▸ Step 3: Manage Buys | ▼ Review Plan Get Help on:
• Rebalancing Wizard
• Advice Suite

Edit Buy Recommendations

Below is a list of all of the buy recommendations that you have included in your plan. You can edit the quantities of your recommendations.

Sells Recommendations

| Remove | Position | Buy Qty/Amt. | Acct. # (Type) | Shares Price | Asset Class | Category | Style | Rating |
|---|---|---|---|---|---|---|---|---|
| ☐ | AMSTX | ⦿ Qty ○ Amt 1,000.00 | 10054109 IRA | $35.35 | Large Cap Equity | Large Value | Value | N/A |
| ☐ | FJA3Z | ⦿ Qty ○ Amt 2,000.00 | 10054109 IRA | $9.12 | International Equity | N/A | N/A | N/A |
| ☐ | FMOX | ⦿ Qty ○ Amt 1,000.00 | 10054109 IRA | $27.97 | Small Cap Equity | Small Growth | Blend | N/A |
| ☐ | IBM | ⦿ Qty ○ Amt 1,000.00 | 10054109 IRA | $79.75 | Large Cap Equity | Information Technology | Growth | B |
| ☐ | JAEIX | ⦿ Qty ○ Amt 5,000.00 | 10054109 IRA | $15.59 | Large Cap Equity | Large Blend | Blend | N/A |
| ☐ | RSGVX | ⦿ Qty ○ Amt 5,000.00 | 10054109 IRA | $9.46 | Fixed Income | N/A | N/A | N/A |
| ☐ | SWSSX | ⦿ Qty ○ Amt 5,000.00 | 10054109 IRA | $15.70 | Small Cap Equity | Small Blend | Blend | N/A |
| ☐ | UEPIX | ⦿ Qty ○ Amt 1,000.00 | 10054109 IRA | $10.27 | International Equity | N/A | N/A | N/A |
| ☐ | VFINX | ⦿ Qty ○ Amt 1,000.00 | 10054109 IRA | $89.46 | Large Cap Equity | Large Blend | Blend | N/A |

Save & Continue »

Your Personal Rebalancing Plan

1900

Here is a summary of the rebalancing plan that we discussed based on your input. If you elect to place any trade orders, your Schwab representative can help you. For the most recent research report on the securities listed below, please visit Schwab.com or contact your Schwab Investment Consultant.

Schwab Brokerage Account #1234-5678, Taxable

Sell — 1901

| ✓ | Symbol | Position Name | $ Amount | Quantity | Rating* | Reason for Recommendation |
|---|---|---|---|---|---|---|
| ☐ | XYZ | XYZ Corporation | $17,640 | 1,000 | F | Sell all of your XYZ because it has a low rating (D). |
| ☐ | ABCD | XXXXX XXXXXX Growth Fund | $4,500 | 140 | | Sell all of your ABCD because it is underperforming compared to its peers. |
| ☐ | DFGHX | U.S. Treasury Note 4.5% 02/14 | $50,000 | 2250 | AA | Sell $50,000 of your DFGHX because you are over allocated in fixed income and it i your lowest rated fixed income holding. |

Buy

| ✓ | Symbol | Position Name | $ Amount | Quantity | Rating* | Reason for Recommendation |
|---|---|---|---|---|---|---|
| ☐ | AAA | AAA Corporation | $18,410 | 1,000 | A | Buy 1,000 shares of AAA because you are under allocated in the Energy sector and it is an A rated Energy stock. |
| ☐ | AAAAXXXXX | AAAA Growth Fund | $10,500 | 140 | | Buy 140 shares of AAAAXXXXX because Blah, blah, blah... |

1902     1904

* Stock Ratings are provided by Schwab Equity Ratings. Bond credit ratings are based on the rating given by Standard & Poor's. For additional details on these ratings, see Terms & Definitions.

*The purpose of this report is not to document any recommendation that we have occurred. "Buy" and "Sell" simply reflect the actions you suggested or would need to take to rebalance your portfolio.* This report covers positions held in the Schwab accounts you selected for his analysis as of Month XX, Year. If any account is held at another institution, Schwab is relying on you alone for complete and timely information about that account and your holdings there. There may be information or data relevant to that account about which Schwab is not aware. You acknowledge that Schwab is not responsible for actions taken in those accounts. This analysis does not take into account the tax implications or transaction costs associated with "buying" or "selling" securities. Please consult your tax advisor as appropriate. *Timing of analysis:* This analysis is based in part on the market capitalization of the companies you hold securities in. The market capitalization of companies can vary significantly with the elapse of time. If you choose to not implement your Rebalancing Plan at the time of the consultation, please check with your Investment Consultant before acting at a later date. Your personal financial circumstances, market conditions and other factors change rapidly and can affect whether or not any recommendations given remain suitable for you. The Rebalancing Plan is subject to your account and other applicable agreements with Schwab.

FIG. 19A

Rebalanced Asset Allocation

This page highlights the difference between you current asset allocation and your rebalanced asset allocation if you were to implement the trades discussed today. In the table below, the Adjustment columns show the difference between your current and the rebalanced portfolio allocations.

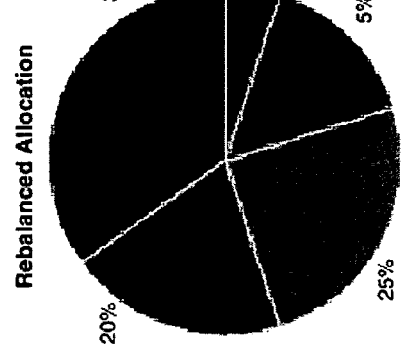

Current Allocation — 1906

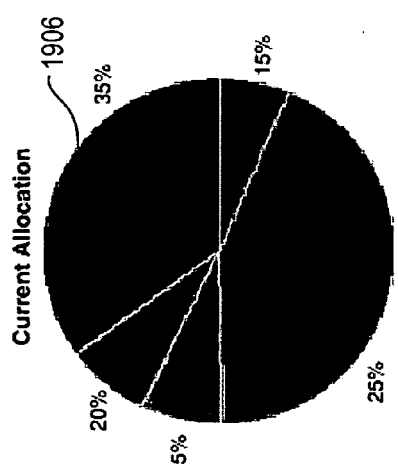

Rebalanced Allocation

Rebalancing Guidelines: Portfolio Allocation

| Asset Class | Current % | Current $ | Client Preferred | Rebalanced % | Rebalanced $ | Adjustment % | Adjustment $ |
|---|---|---|---|---|---|---|---|
| Large Cap Equity | 25.0% | $200,892 | 35.0% | 35.0% | $307,892 | 10.1% | ($1,034.8) |
| Small Cap Equity | 25.0% | $200,938 | 20.0% | 20.0% | $175,938 | -5.3% | $108,388.5 |
| International Equity | 5.0% | $40,923 | 25.0% | 25.0% | $219,923 | 20.1% | $153,325.3 |
| Fixed Income | 35.0% | $131,953 | 15.0% | 15.0% | $131,954 | -15% | ($248,721.5) |
| Cash | 10.0% | $83,985 | 5.0% | 5.0% | $43,985 | -5.2% | ($11,956.5) |
| Other | 0.0% | $0 | 0.0% | 0.0% | $0 | -0.0% | ($1.0) |
| Total | | $879,692 | | | $879,692 | | |

1910

Your Rebalanced Portfolio

This section includes a summary of the holdings in your new portfolio if you implement this Rebalancing Plan in its entirety.
* Some or all of this holding is not currently in your portfolio, but is included in your rebalancing plan.

Large Cap Holdings - 35%

| Symbol (accounts) | Holding Name | $ Amount | Quantity | Rating* | Sector |
|---|---|---|---|---|---|
| XYZ (1,3) | XYZ Corporation | $17,640 | 1,000 | A | Technology |
| * ABCD (1) | XXXXX XXXXX Growth Fund | $4,500 | 140 | | Health |
| DFGHX (3) | XXXXX XXXXX | $50,000 | 2250 | | Cash |
| * BBBB (1) | XXXXX XXXXX | $4,500 | 140 | | Health |
| CCC (3) | XXXXX XXXXX | $50,000 | 2250 | | XXXXX |
| DDDD (2) | XXXXX XXXXX | $4,500 | 140 | | Health |

Small Cap Holdings - 25%

| Symbol (accounts) | Holding Name | $ Amount | Quantity | Rating* | Sector |
|---|---|---|---|---|---|
| * EEE (1) | XYZ Corporation | $17,640 | 1,000 | A | Technology |
| FFFFF (2) | XXXXX XXXXX Value Fund | $4,500 | 140 | | Health |
| GGG (1,3) | XXXXX XXXXX | $50,000 | 2250 | | Cash |
| HHHH (2) | XXXXX XXXXX | $4,500 | 140 | | Health |

1. Roth IRA, 2. Brokerage, 3. SEP IRA

* Stock Ratings are provided by Schwab Equity Ratings. Bond credit ratings are based on the rating given by Standard & Poor's. For additional details on these ratings, see Terms & Definitions. The rebalanced portfolio summary is an estimate as of the date of this report. Because securities valuations change over time, the actual rebalanced results will vary. *The purpose of this report is not to document any recommendation that may have occurred. "Buy" and "Sell" simply reflect the actions you suggested or would need to take to rebalance your portfolio.* This report covers positions held in the Schwab accounts you selected for his analysis as of Month XX, Year. If any account is held at another institution, Schwab is relying on you alone for complete and timely information about that account and your holdings there. There may be information or data relevant to that account about which Schwab is not aware. You acknowledge that Schwab is not responsible for actions taken in those accounts. This analysis does not take into account the tax implications or transaction costs associated with "buying" or "selling" securities. Please consult your tax advisor as appropriate. *Timing of analysis:* This analysis is based in part on the market capitalization of the companies you hold securities in. The market capitalization of companies can vary significantly with the elapse of time. If you choose to not implement your Rebalancing Plan at the time of the consultation, please check with your Investment Consultant before acting at a later date. Your personal financial circumstances, market conditions and other factors change rapidly and can affect whether or not any recommendations given remain suitable for you. The Rebalancing Plan is subject to your account and other applicable agreements with Schwab.

FIG. 19C

Your Rebalanced Portfolio
...Continued

This section includes a summary of the holdings in your new portfolio if you implement this Rebalancing Plan in its entirety. — 1916
* Some or all of this holding is not currently in your portfolio, but is included in your rebalancing plan.

International - 10%  — 1920

| Symbol (accounts) | Holding Name | $ Amount | Quantity |
|---|---|---|---|
| XYZ (1, 3) | XYZ Corporation | $17,640 | 1,000 |
| * ABCD (1) | XXXXX XXXXX Growth Fund | $4,500 | 140 |

Fixed Income - 25%  — 1918

| Symbol (accounts) | Holding Name | $ Amount | Quantity | Rating* |
|---|---|---|---|---|
| XXXXX (1, 3) | 6 MO CD | $20,000 | 1,000 | AA |
| ABCD (3) | XXXXX XXXXX Money Market | $4,500 | 140 | AA |

Cash or Equivalent - 5%  — 1924

| Symbol (accounts) | Holding Name | $ Amount |
|---|---|---|
| Cash (1, 3) | Total Cash | $30,000 |

Other - 15%  — 1922

| Symbol (accounts) | Holding Name | $ Amount | Quantity |
|---|---|---|---|
| XYZ (1) | XYZ Convertible Bond | $30,000 | 30,000 |

1. Roth IRA, 2. Brokerage, 3. SEP IRA

* Stock Ratings are provided by Schwab Equity Ratings. Bond credit ratings are based on the rating given by Standard & Poor's. For additional details on these ratings, see Terms & Definitions.

The rebalanced portfolio summary is an estimate as of the date of this report. Because securities valuations change over time, the actual rebalanced results will vary. *The purpose of this report is not to document any recommendation that may have occurred. "Buy" and "Sell" simply reflect the actions you suggested or would need to take to rebalance your portfolio.* This report covers positions held in the Schwab accounts you selected for his analysis as of Month XX, Year. If any account is held at another institution, Schwab is relying on you alone for complete and timely information about that account and your holdings there. There may be information or data relevant to that account about which Schwab is not aware. You acknowledge that Schwab is not responsible for actions taken in those accounts. This analysis does not take into account the tax implications or transaction costs associated with "buying" or "selling" securities. Please consult your tax advisor as appropriate. *Timing of analysis*: This analysis is based in part on the market capitalization of the companies you hold securities in. The market capitalization of companies can vary significantly with the elapse of time. If you choose to not implement your Rebalancing Plan at the time of the consultation, please check with your Investment Consultant before acting at a later date. Your personal financial circumstances, market conditions and other factors change rapidly and can affect whether or not any recommendations given remain suitable for you. The Rebalancing Plan is subject to your account and other applicable agreements with Schwab.

Client Preferences

We have incorporated your preferences into this Rebalancing Plan to meet your specific investment needs.

Asset Allocation Preferences — 1926

| Asset Class | Client Preferred | Moderately Aggressive[1] |
|---|---|---|
| Large Cap Equity: | 35% | 40% |
| Small Cap Equity: | 25% | 25% |
| International Equity: | 10% | 10% |
| Fixed Income: | 20% | 10% |
| Cash or Equivalent: | 10% | 10% |
| Other: | 0% | 0% |

Sector Allocation Preferences — 1928

| Sector | Client Preferred | Wilshire 5000 | Sector | Client Preferred | Wilshire 5000 |
|---|---|---|---|---|---|
| Consumer Discr.: | 10% | 10% | Industrials: | 10% | 10% |
| Consumer Staples: | 10% | 10% | Technology: | 10% | 10% |
| Energy: | 10% | 10% | Materials: | 10% | 10% |
| Financials: | 10% | 10% | Telecom.: | 10% | 10% |
| Health Care: | 10% | 10% | Utilities: | 10% | 10% |

Account and Position Preferences

| Instruction | Account/Securities | Reason |
|---|---|---|
| Do Not Trade in These Accounts: | Account #1234-5678 | Client request |
| Do Not Sell These Securities: | Account #1234-5679: $10,000 ABC | Gift from Inlaws |
| | Account #1234-5679: 300 shares DCTM | Tax implications |
| Sell These Securities: | Account #1234-5675: Sell 300 shares | Per our discussion, we agreed that you should reduce this concentrated position |
| | Account #1234-5674: Sell 300 shares EFG | Harvest losses for tax purposes |
| Do Not Spend: | Account #1234-5678: $20,000 Cash | Set aside cash for other purposes |
| | Account #1234-5678: $30,000 6MO CD | Illiquid position |

Other Rebalancing Preferences — 1930

| | |
|---|---|
| Sell Small Holdings: | Sell all holdings that comprise less than 1% of portfolio. |
| Maximum Equity Concentration: | Do not allow any equity holding to comprise more than 20% of portfolio. |

[1] Schwab Model Asset Allocations (Conservative, Moderately Conservative, Moderate, Moderately Aggressive, Aggressive) were developed by the Schwab Center for Investment Research® and selected here based on your investor risk profile for this portfolio.

SYSTEM AND METHOD FOR PROVIDING FINANCIAL ADVICE FOR AN INVESTMENT PORTFOLIO

COPYRIGHT NOTICE

Contained herein is material that is subject to copyright protection. The copyright owner has no objection to the facsimile reproduction of the patent disclosure by any person, as it appears in the Patent and Trademark Office patent files or records, but otherwise reserves all rights to the copyright whatsoever.

FIELD OF THE INVENTION

This invention relates to the field of making specific investment recommendations. More particularly the invention provides for making specific buy and sell recommendations and can provide an explanation in connection with the basis for each recommendation.

BACKGROUND

In the past a number of different financial tools have been provided to investors to provide investment advice. One type of financial tool provided was a computer implemented financial advice system that utilized optimization algorithms. These optimization algorithms typically utilized advanced mathematical techniques and estimates of each security's expected return and considered complex correlations between large numbers of different securities. These optimization tools are intended to determine a set of securities that are predicted to offer the highest level of return for a given client's level of risk tolerance. In such optimization approaches the recommended portfolio is said to be "mean-variance efficient". The optimization algorithms precisely balance each security's return with its impact on the portfolio's level of risk. Examples of systems and methods utilizing, or relating to different optimization techniques include U.S. patent application Ser. No. 09/654,627 SYSTEM AND METHOD FOR TAX SENSITIVE PORTFOLIO OPTIMIZATION, filed Sep. 5, 2000, and assigned to the same assignee as the present invention; U.S. Pat. No. 6,021,397 FINANCIAL ADVISORY SYSTEM; U.S. Pat. No. 5,812,987 INVESTMENT FUND MANAGEMENT METHOD AND SYSTEM WITH DYNAMIC RISK ADJUSTED ALLOCATION OF ASSETS; U.S. Pat. No. 6,484,152 AUTOMATED PORTFOLIO SELECTION SYSTEM; U.S. Pat. No. 5,784,696 METHODS AND APPARATUS FOR EVALUATING PORTFOLIOS BASED ON INVESTMENT RISK; U.S. Pat. No. 6,510,419 SECURITY ANALYST PERFORMANCE TRACKING AND ANALYSIS SYSTEM AND METHOD; U.S. Pat. No. 6,012,044 USER INTERFACE FOR A FINANCIAL ADVISORY SYSTEM; U.S. Pat. No. 6,003,018 PORTFOLIO OPTIMIZATION BY MEANS OF RESAMPLED EFFICIENT FRONTIERS—each of the above referenced applications and patents are hereby incorporated by reference in their entirety.

In general the prior optimization systems provide for jointly analyzing assets in the portfolio. Since the securities in the recommended portfolio are analyzed jointly, from a client's perspective there is no clear explanation as to why any one security is recommended over another.

Consequently, many clients view these optimization tools as "black boxes". In general clients, and in particular individual investors, have been slow to adopt and utilize the portfolios recommended by optimization types of tools. Indeed, experience has shown that many individual investors want to have a higher degree of understanding in the underlying building of the recommended portfolio, and further many of individual investors would like to directly participate in the building of their investment portfolios.

Other systems have been developed which are more focused on using asset allocation models to determine investment strategies. These previous systems were not, however, designed to accommodate specific client preferences, and to provide explanations for specific recommendations. One such system is shown in pending patent application SYSTEM AND METHOD FOR PORTFOLIO ANALYSIS (U.S. patent application Ser. No. 09/667,017, filed Sep. 20, 2000), which is assigned to the same assignee as the present patent application, and which is incorporated by reference herein in its entirety.

BRIEF DESCRIPTION OF THE DRAWINGS

FIG. 1 shows a method of an embodiment of the invention.

FIG. 3 is a display of a client preference summary.

FIGS. 4a-4d are displays of edit preference tables.

FIG. 5 is a display of recommend sells due to poor ratings and client preferences.

FIG. 6 is a display of recommended sells for sector diversification.

FIG. 7 is a display of recommended sells due to asset class concentration.

FIG. 8 is a display of recommended sells, and alternate sale possibilities.

FIG. 9 is a display of a recommended sell summary.

FIGS. 10a-10b are a displays of recommended buys of domestic equities.

FIG. 11 is a display of recommended busy of international equities.

FIG. 12 is a display of recommended buys for fixed income.

FIG. 13 is a display of a plan summary.

FIG. 14 is a display of an edit table for all sell recommendations.

FIG. 15 is a display of an edit table for all buy recommendations.

FIG. 16 is a display of an table for adding specific recommended sells.

FIGS. 17a-17b are displays of tables for adding additional recommended buys.

FIGS. 19a-19g is a display of pages from an overall rebalancing plan.

DETAILED DESCRIPTION

Figure 2A:
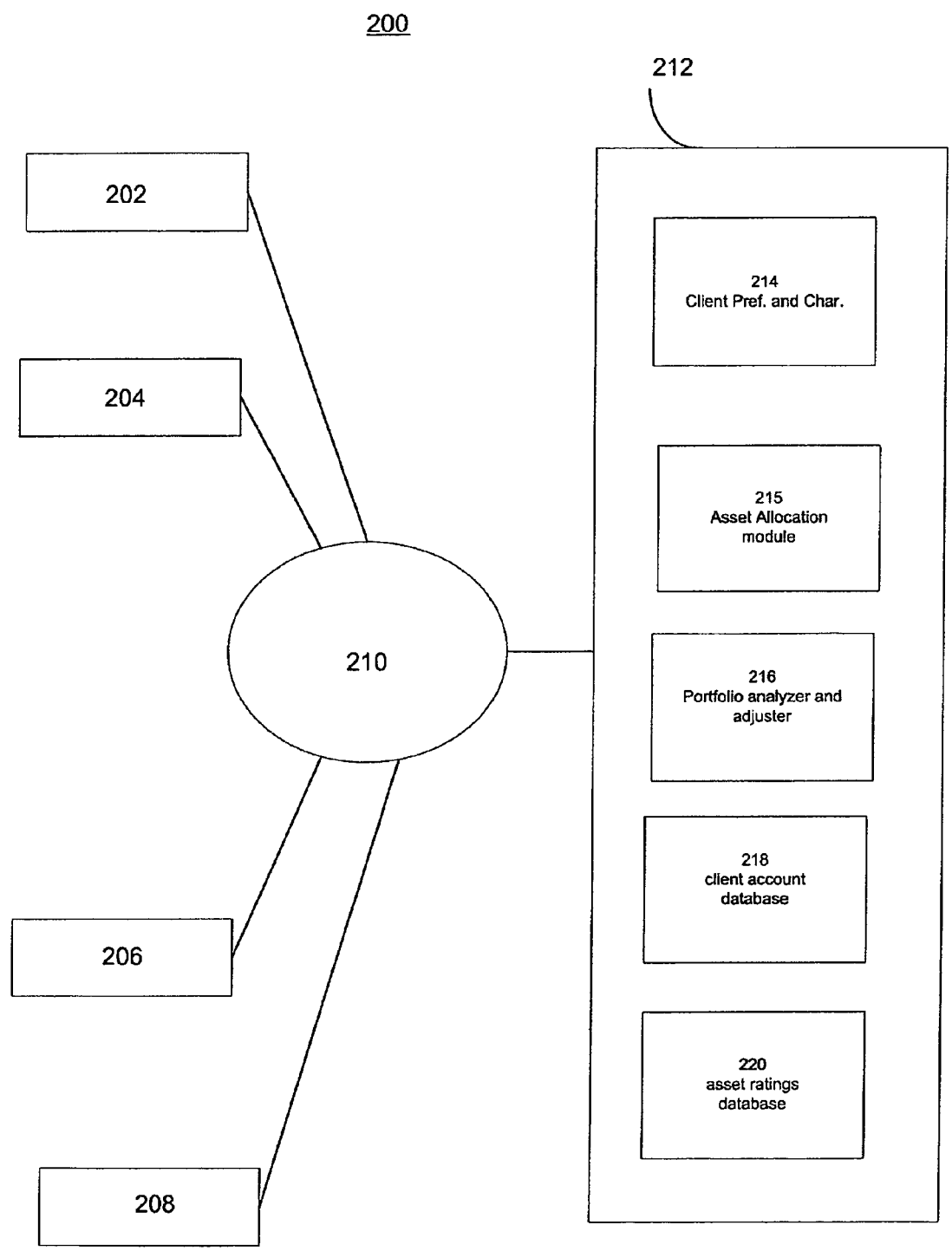
FIGS. 2a-b shows an embodiment of a system of the invention.

One aspect of an embodiment herein provides a computer system, which is designed to provide financial advice based on an underlying methodology that is rules based, and sequential, such that the operation is relatively easy for an investor, or client, to understand, and allows for the client's direct participation in deciding which assets should be held in the investment portfolio. The system and method herein provide a financial advisory system where the underlying operation is designed to be transparent and intuitive, such that an individual investor will have the confidence to follow the financial advice recommendations. Further, the system is such that an investor can make decisions with regard to specific recommendations, and review alternative recommendations.

The underlying approach is built on a number rules which can be adapted for different client characteristics as determined by a client's circumstances and preferences. A method 100 of an embodiment herein is shown in FIG. 1. This method would be performed on a computer network as described in more detail below. A first part of the method 100, is to input 102 a client's risk tolerance and preferences. As is known in the art a client's risk tolerance can take into account a number of specific client characteristics, which could include a clients investment horizon, investment experience, and so forth. A client's preferences can include preferences with regard to holding or selling certain assets held in the investor's portfolio. Other types of possible preferences include asset allocation preferences, sector preferences, index funds versus actively managed funds, and stocks versus mutual funds. Where specific client preferences are not input, the method can utilize preference defaults 104 which are consistent with the rules applied by the system. The method further utilizes a library of different model portfolios 106, where the model portfolios are correlated to different client risk tolerances. The method then provides for modifying the model portfolio that most closely correlates with a particular client risk tolerance, in response to the client's preferences. The method also provides for assessing the quality of assets held in the client's portfolio 108. In conjunction with assessing the quality of assets held in the portfolio a securities ratings database 110 can be utilized. Further in connection with assessing the quality of other assets held in the portfolio other asset ratings databases could be provided. For example, a mutual fund rating database 112 could be provided for rating different mutual funds. The assessment of the quality of the different assets held in the portfolio could provide for selling assets that are rated below a certain level in the corresponding asset rating database.

In addition to rules for assessing assets based on quality, other rules provide for recommending elimination of over concentration 114 in a single asset or equity. The method 100 also provides a rule for recommending the sale of one or more assets where a portfolio has an over concentration 116 in certain market sectors, where a target sector allocation is generally a market sector allocation, such as the Wilshire 5000 index sector weights. Further, a rule of the method provides for making recommendations to eliminate over concentration in any particular asset class 118, so that portfolio will achieve asset class diversification. The rules of method 100 provide not only for the recommendation of selling certain assets, but also for recommending the purchase of assets 120 to meet asset sector and asset class targets. While the general asset type and category type for assets to be purchased is generally determined in manner consistent with achieving specific target allocations, the determination as to which specific asset, such as stock or mutual fund to purchase, is made in connection with referring to recommended lists of stocks, or highly rated stocks 122 or mutual funds 124, where these recommended assets can be derived by referring to ratings for stocks and mutual funds rating databases 110 and 112. The recommendations of specific sales and purchases of assets can be output in the form of a client report 126, or plan summary 130, or by a screen shot generated on a computer display 128. Additional aspects of, operations relating to, the method 100 are discussed in detail below.

Figure 2B:
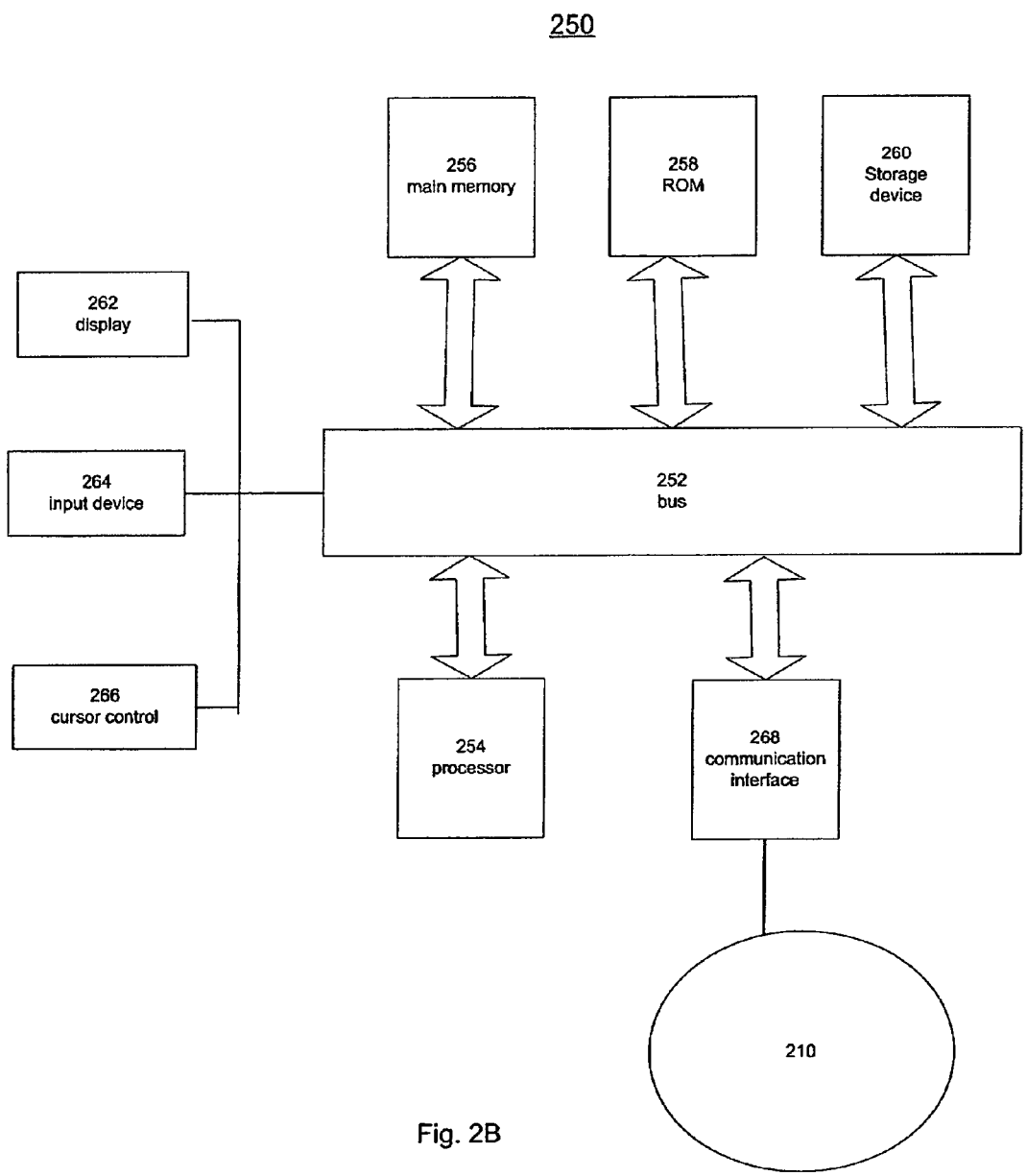

FIG. 2A shows a view of an embodiment of the system 200 herein. In this embodiment a number of financial advisor computers 202-208 are provided. These computers can be general-purpose personal computers. These financial advisor computers are connected to a computer network 210, which allows the financial advisor computers to communicate with a back office computer system 212. The back office computer system could consist of a single computer or a number of computers networked together. For purposes of this discussion we will assume that the back office computer system 212 is a computer such as a mainframe computer or an application server. The computer network 210 could include the Internet, WANs, and LANs, as well as other network configurations. General elements of a computer 250 are shown in FIG. 2B.

Computer system 250 includes a bus 252 or other communication mechanism for communicating information, and a processor 254 coupled with bus 252 for processing information. Computer system 250 also includes a main memory 256, such as a random access memory (RAM) or other dynamic storage device, coupled to bus 252 for storing information and instructions to be executed by processor 254. Main memory 256 also may be used for storing temporary variables or other intermediate information during execution of instructions to be executed by processor 252. Computer system 252 further includes a read only memory (ROM) 258 or other static storage device coupled to bus 252 for storing static information and instructions for processor 254. A storage device 260, such as a magnetic disk or optical disk, is provided and coupled to bus 252 for storing information and instructions.

A display 262 can be coupled to the bus 252 displaying information to a computer user. As discussed below images shown on the display to convey information to a user can be referred to as screen shot. An input device 264, including alphanumeric and other keys, is coupled to bus 252 for communicating information and command selections to processor 254. Another type of user input device is cursor control 266, such as a mouse, a trackball, or cursor direction keys for communicating direction information and command selections to processor 254 and for controlling cursor movement on display 262.

The invention is related to the use of computer system for providing financial advice to customers. According to one embodiment of the invention, a proposed financial plan is provided by using a computer system to store and analyze information about a customer, their investment holdings (portfolio), the customer preferences, and characteristics, and information about different securities, and then based on the analysis and a set of rules providing a financial plan to a customer. In one embodiment, analysis and providing of information is achieved in part by the execution of the sequences of instructions contained in a main memory 256 by the processor 254. One or more processors in a multi-processing arrangement may also be employed to execute the sequences of instructions contained in main memory 256. In alternative embodiments, hard-wired circuitry may be used in place of, or in combination with, software instructions to implement the invention. Thus, embodiments of the invention are not limited to any specific combination of hardware circuitry and software.

Computer system 250 also includes a communication interface 268 coupled to bus 252. Communication interface 268 provides a two-way data communication coupling to the network 210.

Referring back to FIG. 2A, the system 200 is described at an operational level. In typical operation a client would meet with a financial advisor, and the financial advisor would log on to a financial advisor computer 202. The financial advisor computer 202 would communicate with the computer system 212 via the network 210. In typical operation the computer system 212 would communicate with the financial advisor computer 202, and cause the display of computer 202 to generate screen shots which would prompt the financial advisor to input information about the client. One important piece of information is the client's risk tolerance. As is known in the art a client's risk tolerance is frequently determined based on client characteristics which can include a customer's age, expected number of years until retirement, expected expenses at time of retirement, investment horizon, and other information. Further, as is discussed in more detail below specific investment preferences can also be input for each customer.

In one embodiment the software, which operates to generate the financial plan, would be loaded on the computer system 212. This software is generally referred to herein as a rebalancing engine. The financial advisor would input client specific information on the financial advisor computer 202. This information would be transmitted to the computer system 212 via the network 210. The rebalancing engine software includes a number of different modules. One module is a client characteristics and client preferences module 214. This module receives and stores client characteristics and client preferences. An asset allocation module 215 determines a target asset allocation for a client, based on the client's characteristics and preferences. In addition to the asset allocation module 215, or incorporated into the asset allocation module, a sector allocation module can be incorporated which operates to make recommendations to ensure that the recommended portfolio does not have an over concentration of assets in certain sectors. Additionally a security-type allocation module can be provided to make recommendations so that a diversified range of security types are held in the recommended portfolio. A portfolio analyzer and adjuster module 216 analyzes assets held in a client's portfolio, and makes recommendations as to assets which should be bought and sold in order to bring a client's portfolio closer to the target asset allocation, sector allocation, security-type allocation, and to improve the quality of assets in the portfolio. In determining assets held in a client's portfolio, the portfolio adjuster module 216 accesses a client account database 218, which identifies a customer's accounts and the securities held in the customer's accounts. Further, in connection with determining assets for purchase and sale, the portfolio adjuster 216 will utilize asset ratings information from an asset ratings database 220. In one embodiment the asset ratings database will contain ratings for a wide range of assets, and the assets will be given a rating of A, B, C, D, or F, with A being the highest rating, and F being the lowest rating. One example of such a rating system is the Schwab Equity Rating™ rating system, provided by Charles Schwab & Co. Inc. Another equity system is the provided by Standard & Poor's, and the Standard & Poor's system uses stars to indicate the equity ratings.

Below is a discussion of some aspects of operation of the system, and figures are shown that illustrate specific screen shots that can be generated by the rebalancing engine and transmitted to the financial advisor computer for display. These screen shots operate to solicit specific information from the financial advisor, so that a recommended financial asset reallocation plan will reflect a client's specific preferences and characteristics.

The rebalancing engine is designed to be transparent and intuitive, mimicking the way a human being might solve a portfolio problem. The rebalancing engine can utilize a set of rules, described in more detail below. However, it should be recognized that the underlying rules can vary and still achieve benefits described herein. At its core the operation is designed to adapt to different client circumstances and preferences. To achieve accommodation of specific client preferences, rather than arrive at a set of overall recommendations as part of one apparently single process, the rebalancing engine divides the analysis into different stages and through a process of repeated steps and soliciting of input from the financial advisor arrives at a set of recommended sell and recommended buys, and then outputs a report explaining the basis for different elements of the recommended actions. In general the operation includes ascertaining a set of client preferences. An overall asset allocation, sector allocation and security type allocation is determined based on the client preferences. Based on the overall allocation the current portfolio is analyzed and buy and sell recommendations are made. This process of recommending buy and sells can take into account the tax impact of different potential buy and sell recommendations. The buy and sell recommendations can take into account the specific ratings of the different assets.

Since the rebalancing engine selects securities independent of their correlations with other securities, one could argue that the recommended portfolio (as determined in part buy the recommended buys and sells) will be inferior, i.e. not mean-variance efficient, to those recommended by traditional optimization software. However in actual practice this would likely not be the case, because optimization programs rely heavily on estimated inputs into the mean-variance optimizer functions. In general, these estimated inputs are uncertain and estimates of mean-variance optimal solutions are very sensitive to these inputs. In an embodiment of the present system the underlying target asset allocations correspond to model portfolios constructed via mean-variance optimization and serve as the basis for the recommended asset allocation. In addition, the rebalancing engine recommends diversified portfolios across different financial sectors and recommends only those stocks and mutual funds that are highly rated. Therefore, the recommendations, after accounting for the statistical error in the correlation estimates used in traditional optimization, may be even closer to the true efficient frontier than estimates from traditional optimization routines.

Of course it should be recognized that the recommended portfolio would only fall near the efficient frontier when the investor does not have an excessive number of restrictions on what to sell or buy (as determined by client preferences). The more constraints an investor has, the less efficient her portfolio will be. Of course if a traditional portfolio optimization method allowed for, and followed, similar constraints it would have the same problem. Either the optimizer would not be able to generate an implementable plan, in that the recommended actions violate the investor's constraints, or the optimizer portfolio would fall far from the unconstrained efficient frontier. Within the bounds of statistical error, the portfolios recommended by the rebalancing engine can be, depending on the particular circumstances, even more efficient than those recommended by traditional portfolio optimization. Further, the rebalancing engine provides the additional benefit that it is designed to specifically account for a client's preferences, which means it is more likely that a customer will follow the recommended actions to achieve the recommended portfolio.

An important consequence of the rules-based rebalancing engine is that it can give a precise reason for every sale and purchase, e.g., stock XYZ should be sold due to a low asset rating such as an "F", or mutual fund XYZ should be sold because it's heavily concentrated in the Technology sector, for example, and the investor is over concentrated in that sector. Further, sells could be recommended to eliminate concentrations in individual securities, or to achieve security type diversification. Similarly, purchases could be recommended to achieve various forms of diversification.

The parameters that define the rules can easily be modified so that financial advisors will also be able to customize the session to accommodate a client's needs. The user can override any aspect of the asset allocation process. If the client does not want to hold international equities, then it is removed from his target portfolio. If the client is an aggressive investor but has fairly high liquidity needs, then the rebalancing engine can increase the target weight in cash and decrease his equity holdings. If the client has no interest in owning small cap utility stocks, then the rebalancing engine can reallocate that weight across the remaining sectors. Most importantly, the rebalancing engine can offer a list of alternatives whenever it recommends that a security be purchased or sold. There are many options for a financial advisor to customize a client's portfolio, as will be seen below.

The flexibility and transparency of the rebalancing engine has three important effects. First, it educates the client since the reason for each action accompanies each recommendation. Second, it can transform the process of building a portfolio into collaboration between the financial advisor and the client, by allowing the financial advisor to interactively incorporate the client's preferences. This should increase the likelihood that the client will implement the advice, by allowing the financial advisor and the client to achieve a consensus. Lastly, it can enhance the interaction between and client and a financial advisor, by giving structure to the conversation, automating the background calculations in the investment advice process, and providing the financial advisor with automated access to the information needed to serve the client and freeing the financial advisor to focus on building the relationship.

As mentioned above, one element of the rebalancing engine operation is that it is specifically designed to account for client preferences. For example, one embodiment can allow a client to specify preferences for: purchasing individual stocks or mutual funds or some combination of both security types; passive, active or a Core and Explore® approach to investing (aspects of different investments approaches are widely known in the art, also some different approaches are discussed in pending patent application SYSTEM AND METHOD FOR PORTFOLIO ANALYSIS (U.S. patent application Ser. No. 09/667,017, filed Sep. 20, 2000) which is assigned to the same assignee as the present patent application, and which is incorporated by reference herein in its entirety; value or growth equity investment styles, or some combination of both; avoiding transactions that incur short-term capital gains; constraining certain positions that a client does not want to sell; selling certain assets instead of others in the same asset class; and, tax loss harvesting to offset realized capital gains.

Further, the rebalancing engine provides that when the client has assets in the portfolio that the client does not want to sell and those constraints conflict with an initially calculated target model portfolio, the asset class weights of a the target asset allocation model are revised to match her preferences. Likewise, when the user has a domestic equity style preference, either tilted toward value or growth, the asset class weights are revised to accommodate this preference.

The rebalancing engine can recommend a client buy or sell a particular stock or mutual funds, based on the ratings for assets in one or more asset ratings databases. These ratings could be in the form of a prioritized list of assets, or could be based on different analyst ratings, or a number of other possible rating systems. Further, the asset rating database can account for different styles and sectors. Additionally for mutual funds different rating systems can also be utilized.

Similarly the sell recommendations are based upon several criteria. One general rule of the rebalancing engine is to avoid over-concentration in a single security, and while some specific concentrations are discussed below, it should be recognized that a wide variety of different approaches and different percentages could be used in place of those discussed below. One embodiment of the invention provides that where any individual security occupies more than 20% of a client's portfolio it is recommended to be sold down to 20%.

Further the rebalancing engine avoids over-exposure to a single economic sector. Clients with assets that sum to 20 percentage points above the benchmark sector weight for that asset class, for example, will have some of those assets sold to bring the exposure down to 20% above the benchmark. The rebalancing engine recommends selling low-quality securities with high exposure to the over-weight sector held in tax-advantaged accounts (e.g., 401K or IRA accounts) first. Selling in tax-advantaged accounts is desirable because there are no immediate tax consequences associated with the sale. If these recommendations are not sufficient to reduce the over-weight sector to the desired allocation, then the rebalancing engine recommends selling low-quality securities with high exposure in the over-weight sector held in taxable accounts. Following this, high-quality securities with low exposure to the overweight sector held in tax-advantaged accounts are recommended. If the sector remains over-weight, then high-quality securities with low exposure to the overweight sector held in taxable accounts are recommended. In some cases the rebalancing engine will have to choose from multiple securities with identical quality and exposure to the over-weight sector. In these cases the rebalancing engine recommends selling securities that are primarily invested in the over-weight sector first, and then securities from overweight asset classes. If this doesn't distinguish securities, then position size is the final tiebreaker. The rebalancing engine recommends selling larger positions first to minimize the number of transactions. The selling priority strikes a balance between recommending sales in taxable accounts to mitigate tax consequences with selling lower-quality securities first. It should be recognized, however, that other priority systems could be accommodated.

The rebalancing engine also operates to recommend sales of assets that have poor future expected performance. The determination of expected performance for an asset can be made in connection with reference to a ratings database, where a wide range of different ratings bases and ratings systems could be utilized. For example a rating system, such as the Schwab. Equity Ratings system, could be utilized and any "D" or "F" rated security would be recommended for sale. Alternatively a different rating system such as Standard & Poor's could be utilized. In one embodiment where the client has no equity style preference, any stock that is rated 1 or 2 stars (which corresponds to lower rated securities) by the known Standard & Poor's rating system is sold. (The reason provided by the rebalancing engine, in such a situation could be, for example, "Performance Expectations are Poor"). For mutual funds, the rebalancing engine could also refer to a ratings database system in connection with buy and sell recommendations.

The rebalancing engine can also take into account tax considerations for fixed-income investments, and may recommend that clients sell all taxable bond funds in their taxable accounts and replace them with municipal bond funds, if the client is in a high tax bracket.

The rebalancing engine operates to make recommendations that result in a rebalanced portfolio. Any asset class that is over-weight after the above sales will have additional assets sold in order to meet their target asset allocation. The rebalancing engine recommends selling low-quality securities with high exposure to the over-weight asset class held in tax-advantaged accounts first. If these recommendations are not sufficient to reduce the over-weight asset class to the target allocation, then the rebalancing engine recommends selling low-quality securities with high exposure in the overweight asset class held in taxable accounts. Following this, high-quality securities with low exposure to the overweight asset class held in tax-advantaged accounts are recommended. If the asset class remains over-weight, then high-quality securities with low exposure to the overweight asset class held in taxable accounts are recommended. In some cases the rebalancing engine will have to choose from multiple securities with identical quality and exposure to the over-weight asset class. In these cases the rebalancing engine recommends selling securities that are primarily invested in the over-weight asset class first, and then securities from overweight sectors. If this doesn't distinguish securities, then position size is the final tiebreaker. The selling priority strikes a balance between recommending sales in taxable accounts to mitigate tax consequences with selling lower-quality securities first. It should be recognized, however, that other priority systems could be accommodated.

It is important to note that the system can provide for sophisticated rules in connection with dealing with tax consequences of selling assets. For example, for a client who is sensitive to tax capital gain issues, the system can provide for selecting assets for sale where the least capital gains will be realized. In fact, the rules can be adapted so that a particular asset with a slightly higher expected future performance might be recommended for sale where it would generate no capital gain as a result of the sale, while a different asset with a slightly lower rating would not be recommended for sale because such a sale would generate significant capital gain. In contrast, for a different investor who has significant capital losses, the investor would likely not be concerned with realizing some capital gain, because such a gain would be offset by the losses. In this situation the system could recommend the sale an asset based on its rating without regard to the capital gain consequences. Further, in connection with a situation where a recommended sale of one asset would result in a capital gain, the rules could take this into account and make an additional sale recommendations which would result in tax loss harvesting, where the additional recommended sale would result in a loss which would offset all or part of a capital gain from a different recommended sale.

As discussed above, the rebalancing engine can also take into account position size. The rebalancing engine is designed to balance the simplicity of the portfolio with minimizing the number of transactions. In some cases, the rebalancing engine will not rebalance exactly to the target asset allocation because the dollar amount is too small to have an appreciable effect on performance.

In connection with recommended buys, the rebalancing engine takes into account the asset class under consideration. For bonds the rebalancing engine recommends that the client buy bond funds, selected from a list of highly rated bond funds. Charles Schwab & Co. Inc. and other financial service companies provide such lists of highly rated bond funds. In one embodiment the rebalancing engine recommends taxable bond funds in tax-advantaged accounts and municipal bond funds are recommended for taxable accounts, if the client's tax rate exceeds 28%. If an investor is in a lower tax bracket, then, depending on the circumstances, the rebalancing engine may recommend taxable bond funds in all of the investor's accounts. It should be recognized that other embodiments could include rules for recommending individual bonds versus bond funds. Individual bonds could be selected from a list of individual bonds with desirable characteristics, such as bond rating or maturity date.

In connection with international assets, the rebalancing engine will recommend that the client purchase international and/or global equity funds from list of highly rated funds. It should be recognized that other embodiments could recommend individual international stocks from a list of highly rated international stocks.

In connection with small cap and large cap equities, if the client prefers mutual funds, then the rebalancing engine will recommend funds based upon the fund style, and a rating system such as is provided by number of different financial service providers such as Charles Schwab & Co. Inc. If the customer prefers to purchase individual stocks, then the rebalancing engine will recommend highly rated stock(s), where the ratings can be based on a variety of different rating systems, and stocks in a diversified group of different sectors, for Large Cap and Small Cap respectively, would typically be recommended. The rebalancing engine recommends placing assets into accounts in a tax efficient manner. Security types are ordered by tax efficiency. Starting with tax-advantaged accounts, specific securities with the least tax efficient security type are selected and recommended for purchase in tax-advantaged accounts. The exact amount purchased depends on a number of factors, including whether or not the asset class the security belongs to is under-weighted versus the client's target portfolio, whether or not the sector that the security belongs to is under-weighted, the security's rating, the number of securities to purchase per asset class for mutual funds or per sector for stocks, and any minimum purchase requirements. The rebalancing engine continues to recommend securities for placement in tax-advantaged accounts until the amount held in those accounts exactly matches the client's current allocation to tax-advantaged investments. Securities are selected for taxable accounts in a similar manner except that given equal ratings the more tax efficient securities within a specific security type are given a higher priority.

The operation of the rebalancing engine provides for generation of a report which shows the recommended buys and sells for the portfolio. The report can give clear and discrete reasons for each given recommended action. Since the rebalancing engine is a rules-based portfolio management tool, as opposed to global optimization tool, the rebalancing engine can give specific independent reasons for each and every action recommended. This helps the communication between the financial advisor and the client to proceed much more efficiently, as the report provides specific rationale for each recommendation. Further, the rebalancing engine operates to track each recommended asset to an actual brokerage account. For clients with many brokerage accounts, the representative is not forced to spend a lot of time dividing the securities across the brokerage accounts manually. In an optimization type of system it is very difficult to specifically identify reasons for each recommended action, as the ultimate recommendations are based on very complex interdependency and relationship between different assets held in portfolio.

The operation of one embodiment of the invention is illustrated by consideration of the Figures discussed below. For example, FIG. 3 shows an image, such as screen shots, which could be displayed on a computer monitor of a financial advisor in conjunction with providing financial advice to a client. These screen shots would be shown on the display of the financial advisor computer (such as 202-208).

FIG. 3 shows client preferences summary 300, which shows a particular client's preferences. Also shown in FIG. 3 is a control bar 301, which allows the user to select the application which provides for portfolio recommendation. The control bar includes a number of fields which allows a user to use a mouse to select from a number of different application tools, which can provide for a range of different services, such as a quick view of a client's holdings, a view of a clients current asset allocation, cash flow analysis, portfolio rebalancing analysis, or retirement plan information. As shown the rebalancing field 303 is highlighted which means that the user has accessed the rebalancing engine application. Further, the set preferences sub-field 305 is highlighted showing that the user is working in the client preferences part of the rebalancing engine. The client preferences could be obtained in a number of different ways. Typically, the process would start with a financial advisor meeting with a client investor to determine the client's characteristics and preferences. The financial advisor would then input this information into the financial advisor computer 202 and it would then be transmitted to the computer system 212. This customer information would include an identification of all accounts which the financial institution has for the particular customer. Alternatively, or in addition, the investment counselor and the client could identify the specific accounts which the client would like to include in the investment analysis. In any case, the system can operate to allow for all of a client's investment accounts to be included in the analysis, or for only selected accounts to be included in the analysis.

Based on client characteristics, as discussed above, a risk tolerance for a client can be determined. This risk profile is shown in a risk profile field 304. The client's name, or the name of a particular account, or portfolio of accounts can be identified in name field 302. Cash and account field 306 provides an identification of specific accounts which are included as part of the portfolio and identifies an amount of available cash held in the accounts. Table 308 shows asset allocation information. The column "Model %" in 308 shows a model asset allocation as determined by rules for a given risk profile for a client, and these rules are part of the rebalancing engine. It should be noted that the rules establishing a given asset allocation can be changed over time based on experience, and these rules will generally correspond to investors with shorter time horizons having asset allocations weighted more heavily toward fixed income investments and cash, whereas investors with a higher risk level will generally have asset allocations weighted more heavily toward large cap, small cap, and international equities. This type of asset allocation process is well known in the art.

The "preferred %" column of table 308 shows the actual targeted asset allocation for particular client given their specific preferences. If a client does not express any specific preferences, then the model percentages are the target asset allocation. However, a client can enter a number of preferences as will be discussed in more detail below and these preferences can result in the preferred % asset allocation being different than the model % asset allocation. In addition, an investment counselor could specifically select the "edit" field 310 to make changes to reflect a customer's preferred asset allocation.

Sector Allocation table 312 shows different industry sectors such as cyclical, durables, energy, financials, etc. The rebalancing engine module will typically be programmed such that it would recommend a portfolio which would correspond roughly to the sector allocation as determined by the Wilshire 5000, shown as column Wilshire %. However, as noted above the rules can be changed and modified over time, and in general a wide range of systems and strategies have been developed which are used to determine desired sector allocations. The column "preferred %" of table 312 can be specifically edited by an investment counselor, by using a mouse to click on the edit field 314 which corresponds to the sector allocation field 312. In general operation, for example, an investment counselor might learn that a customer wants to slightly overweight investment in the financials sector, and underweight in the utilities sector. In such a case the investment counselor could use a mouse to click on the edit field 314 and increase the percentage of the investment in the financial sector and decrease the percentage of investment in the utilities sector. Additionally, the number of different stocks which a client would like to own in each sector can be specified.

A sell preferences table 318 shows sell preferences that will be taken into account in determining the specific buy and sell recommendations. The sell preferences field contains 6 rows with different categories of client preferences relating to potentially selling assets held in a client's investment portfolio. Based on the financial advisor's discussion with a client, the investment counselor can go in and edit (by clicking on the edit field 320) the sell preferences to reflect a client's preferences. As shown for example in field 322, the client preferences include, selling small holdings which represent less than 1% of the total portfolio of accounts included in the analysis. The maximum equity concentration row 324 indicates that the customer preference is to not to have any particular equity investment exceed 15% of the total portfolio. The "do not recommend trades in" field 326 shows that the customer preference is not to recommend trades in one particular account that is included in the overall analysis and recommendation process. The do not sell row 328 identifies specific holdings in particular accounts which a client does not want to sell. The force sell row 330 shows specific securities held in specific accounts that a client would like to sell. The do not spend row 332 shows specific cash holdings which a client does not want to spend.

A client buy preference table 334 is shown in part FIG. 3 with specific preferences of the types of investments that a client prefers to purchase. Client preference edit field 336 allows a financial advisor to edit specific client preference data. Row 338 shows cash that a customer wants to hold apart from the recommended portfolio. For example, if a customer is holding $10,000 in one or more of the portfolio accounts, and expects to make a separate investment or purchase with this cash, then the rebalancing engine will leave these assets as cash and not recommend that the cash be used to purchase a specific asset or assets. As shown in the case of the row 338 the client has indicated that they do want to set aside any cash from the rebalancing process. The client preference table 334 also includes a number sub tables (340-346) with client preferences relative to different asset allocation classes. Large cap table 340 shows client preferences with respect to large cap assets, and contains a number of rows showing information regarding client preferences for large cap investments. International table 342, and Small Cap table 344 contain rows relating to preferences for these types of investments.

The actively managed mutual funds row 348 shows the clients preferred percentage of investment in actively managed mutual funds. The Index Funds row 350 shows the client's preferred percentage of investment in index funds, and the individual equities row 352 shows the percentage of investment that client wants to have in individual equities. Row 354 indicates that the totals for the rows 348, 350, and 352 must equal 100%. Managed Accts row 356 shows an amount of money that the client would like to invest in separately managed accounts which correspond to large cap assets. Other Investments row 358 shows an amount of money that the client would like to allocate to other large cap assets. As shown in FIG. 3B, the International Field 342, and the Small Cap field 344 include the same rows, and the investment counselor can edit the information in these rows to reflect the client's specific preferences.

The Fixed Income table 346 shows a client's preferences with respect fixed income investments. Actively Managed Mutual Funds row 360, Index Funds row 362, and Individual Bonds row 364 shows a percentage of the fixed income assets that a client wants to hold in the corresponding type of fixed income asset investment. The Fixed Income field also includes a managed accounts row 366 and another investments row 368, which operate in manner similar to that described above for the identically titled rows of the Large Cap field 340. Additionally, the Fixed Income field 346 includes a State Marginal Tax Rate row 370, a Federal Marginal Tax rate row 372. These rows are used to consider the tax ramifications of income generated by different types of fixed income investments, and are factored into deciding the types of fixed income investments which are recommended. The Only Buy Tax Exempt Funds row 372 allows a client to specifically indicate that they only want to own fixed income assets that are not taxed.

A create a one step-plan field 376 can be provided which allows a user to click on the field 376 with a mouse and the rebalancing engine can provide a recommended plan based on the client's characteristics and preferences. Additionally a save and continue field 378 allows a user to click on this field and progress sequentially through the development of a recommended plan.

Figure 4C:
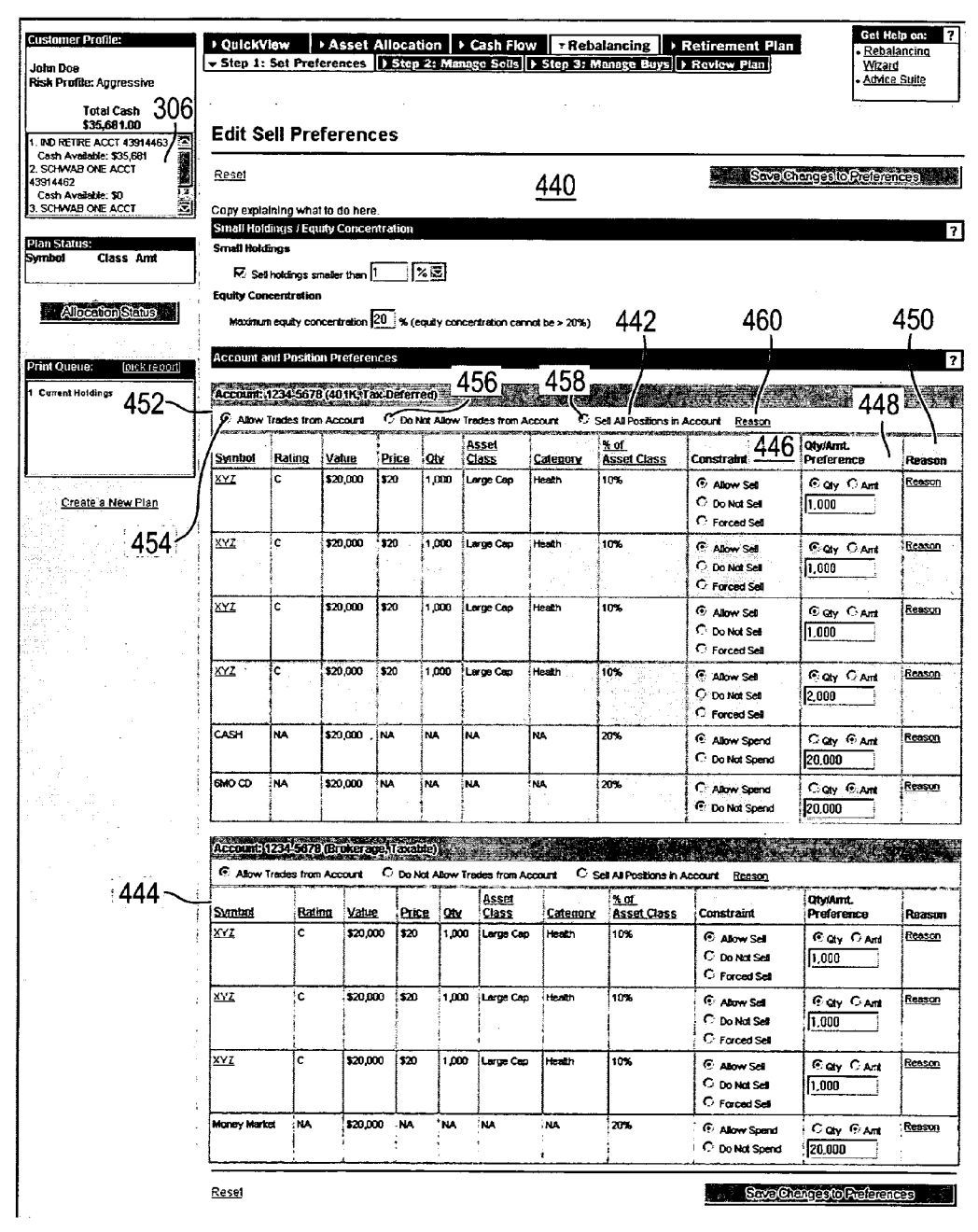

FIGS. 4A-4C show a number of different editable tables which are provided when a user clicks on the different edit fields shown in FIG. 3. FIG. 4A shows a screen shot of an edit asset allocation table 400, which is displayed when a user clicks on the edit field 310. When the edit asset allocation table is displayed the user can click in the fields 404-414 and input the desired percentage of the total portfolio that would be allocated to the corresponding asset class.

FIG. 4B shows a screen shot 416 when an edit sector allocation preferences table 418 is displayed in response to a user clicking on the edit sector allocation field 314. When the edit asset allocation table is displayed the user can click in the fields 420-438 and input the desired percentage of the total portfolio that would be allocated to the corresponding sector.

FIG. 4C shows a screen shot 440 when edit sell preferences tables 442 and 444 are displayed after a user clicks on the edit sell preferences field 320. The number of sell preference tables can correspond to the number of accounts that are included in the analysis as shown in the field 306. The sell preferences tables can include columns showing the assets held in each account, a rating for the asset, a value for the asset, a price for the asset, a quantity for the asset, an asset class, a sector category, and an identification of the total percentage of the asset class. Additionally, a constraint column 446 can be provided. The user can click on different fields in the constraint column to indicate if the investor will allow the asset to be sold, or if they want to force a sell of a particular asset, or if the user will not sell the asset. Further, a Qty/Amt. preference column 448 is provided which allows a user to identify a number of shares or a dollar amount that a client is willing to sell. A Reason column 450 is provided, which allows a user to input a reason related to a client decision with respect to a particular asset. The reason column can be particularly useful where a client specifically decides not to sell an asset for personal reason, as will be shown below. Additionally a status row 452 is provided which allows a user to indicate whether trades will be allowed in an account. For example as shown in status row 452, fields 454-458 are provided which allow a user to specifically indicate that trades are allowed in the account, trades are not allowed in the account, or requiring that all positions be sold in account, respectively. Further, a status row reason field 460 is provided, where a user can click on the reason field 460 and enter a reason for a specific decision with respect the account.

FIG. 4D shows a screen shot 462 when an edit buy preferences table 464 is displayed in response to a user clicking on the edit buy preferences field 336. When the edit buy preferences table is displayed the user can click in the fields 466-470 and input the desired percentage of the type of investment that the client would like to have for each of the asset class. For example field 466 corresponds to the percentage of the large cap investment that the client would like to have in actively managed funds; field 468 corresponds to the percentage of the large cap investment that the client would like to make in index funds; and field 470 corresponds to the percentage of the large cap investment that the client would like to have in individual equities. Similar fields are also provided for the other types of asset classes, small cap, international and fixed income.

Figure 5:
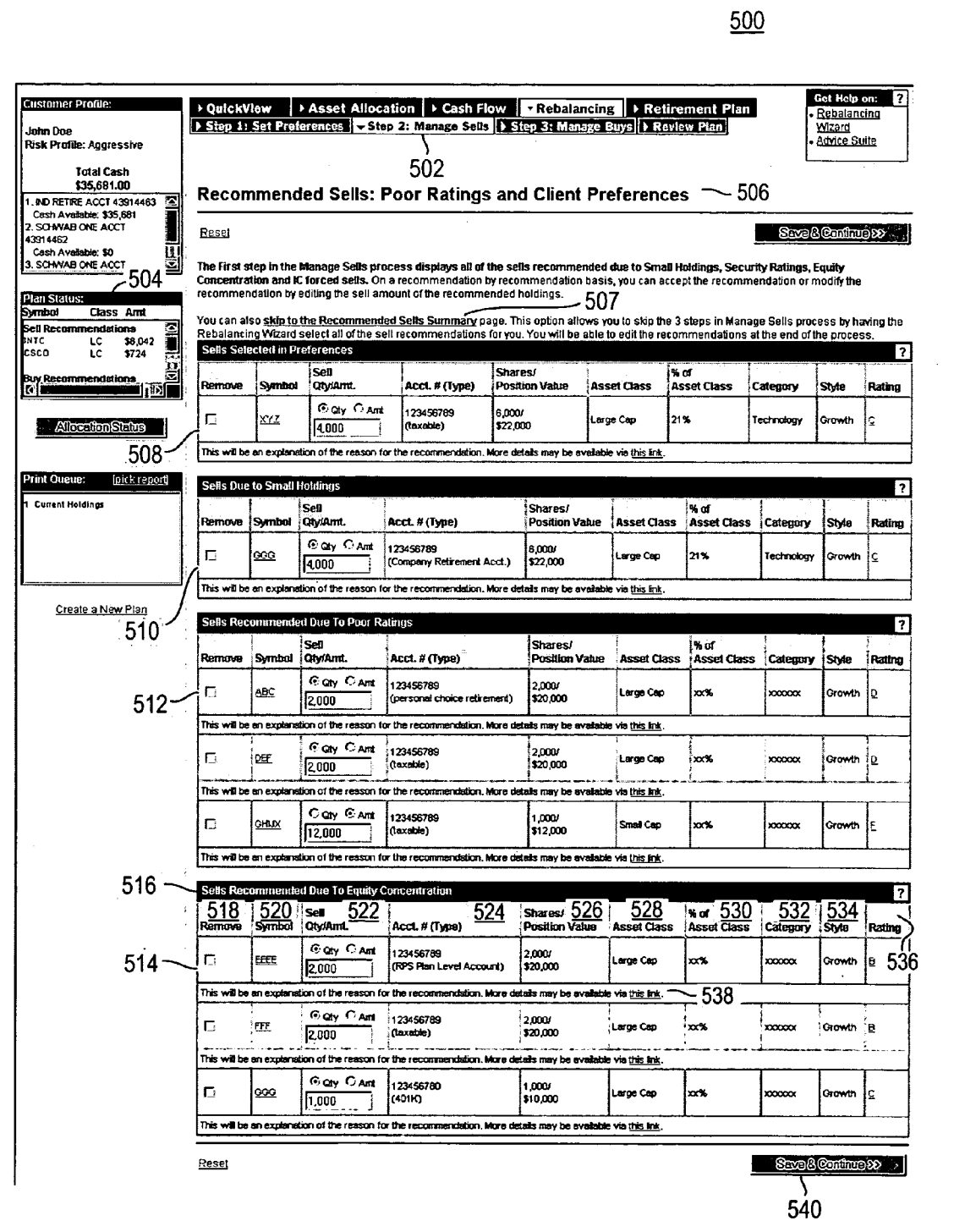

Based on client characteristics, and client preferences, as input by the financial advisor, in connection with the above Figures, recommended sells and recommended buys are generated. The recommended sells and buys can be reviewed and modified in connection with arriving at a recommended plan. FIG. 5 shows a screen shot 500 where the Step 2: Manage Sells field 502 is highlighted. At this point the client preferences have been entered. A recommendation activity scroll window 504 is provided which allows a user to scroll through and see specific sell recommendations. A title field 506 identifies the recommended sells shown in the tables below. Tables 508-514 are sells that are proposed in light of client preferences, poor ratings for the particular asset, or due to equity concentration. A skip to recommended sells summary field 507 which allows a user to skip directly to a summary page discussed in detail below if a user does not want to review a break down of the different category tables 508-514.

Table 508 shows a sell that is proposed in response to a client's indicated preference to sell the asset identified as XYZ. Each table corresponds to a specific category of proposed sale. Table 510 shows sales in light of small holdings, which would be proposed where a client has indicated in the client preferences that they would like to sell smaller holdings. Table 512 proposes sales where a database of ratings for different assets indicates that a particular asset held in the portfolio has a poor rating. Table 514 is an equity concentration table which shows proposed sales because of an overly concentrated position. Taking table 514 for example, elements of the proposed sale tables are described. Header field 516 shows the basis for the proposed sales in the corresponding table. Remove column 518 provides a field where a user can click in the corresponding box to specifically indicate that a proposed sale should be removed the proposed plan. Symbol column 520 shows a symbol (for example a ticker symbol) for an asset. Sell Qty/Amt. Column 522 shows the number of shares, or dollar amount of an asset to be sold. Acct. # (type) column 524 shows the account and type of account which the asset is held in. Shares/position column 526 shows the number of shares and the corresponding value that are proposed to be sold. Asset class column 528 shows the asset class for the asset that is to be sold. % of Asset class column 530 shows the percentage of the asset class represented by the proposed sale.

Category column 532 shows the category for the asset (e.g., for stocks it could show the sector; for mutual funds it could show the asset class; for bonds it could show the type such as municipal or corporate etc.). Style column 534 indicates the type of investment such as growth, value etc. Rating column 536 represents a rating for the asset.

The ratings shown in the figures herein corresponding to a rating system based on a review of different types of market data, which could include past performance, analyst ratings, price to earnings ratio, etc. The specific rating system could be selected from a broad range of different systems that are currently employed across a wide range of different financial service companies. As shown in the rating system of the Figures herein the highest possible rating is an A and the lowest possible rating is an F.

In addition to the general heading 516, which identifies the reason for the proposed sale, a row can be provided with additional specific reasons for a proposed sale, and an additional link 538 can be provided where a user can click on the link to obtain more detailed information regarding the reason for the proposed sale. After the user has reviewed the recommended sells shown in FIG. 5, the user can click on the save & continue field 540 and progress to the next screen.

Figure 6:
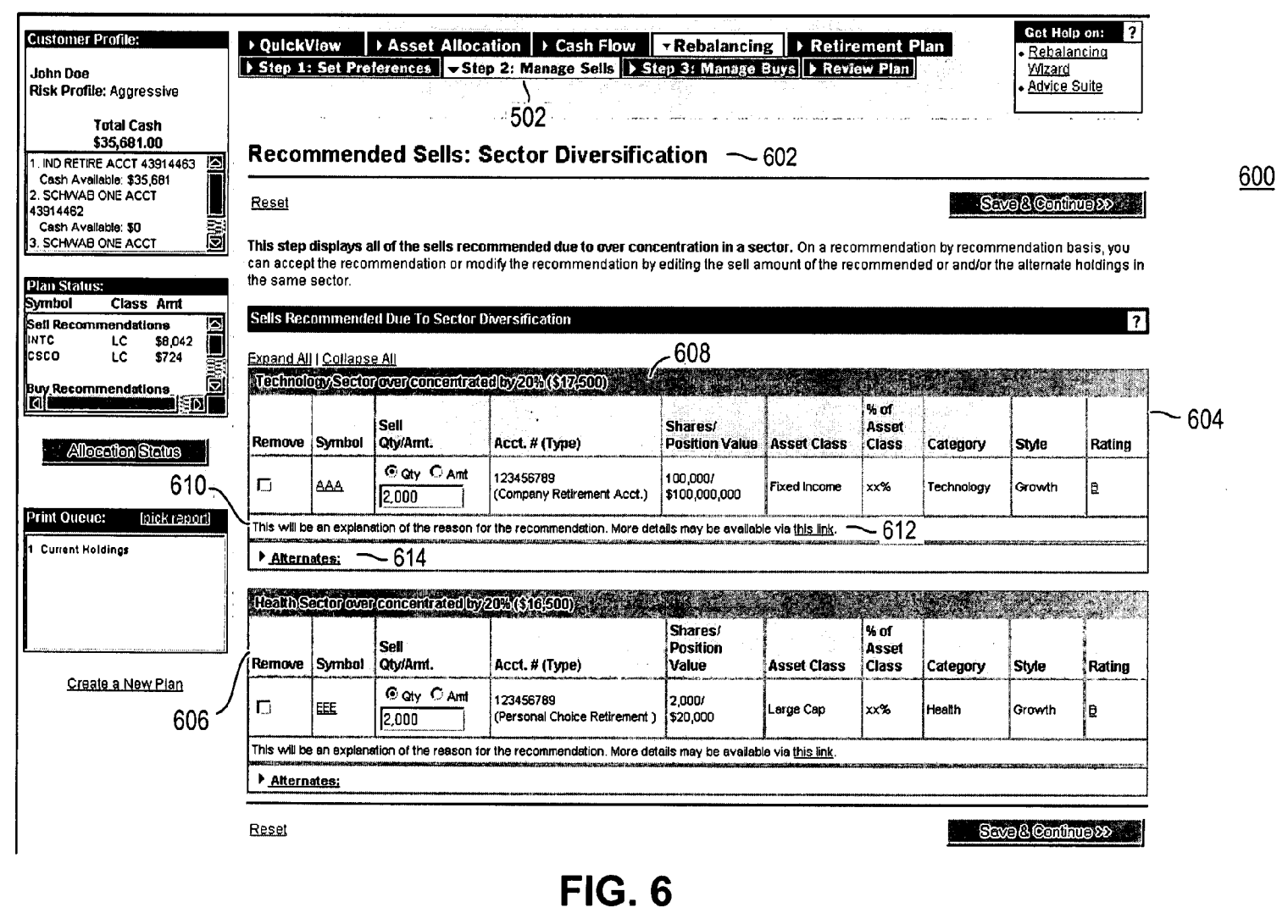

FIG. 6 show the next screen shot 600 where the Step 2: Manage Sells field 502 is highlighted. Again at this point the client preferences have been entered. A title field 602 identifies that the sells shown in the tables below 604 and 606 are sells which are proposed to achieve sector diversification.

Sell sector diversification table 604 shows a proposed sell of asset AAA. Row 608 shows general information regarding the purpose of the proposed sale. Row 610 can be provided to give additional information regarding the proposed sale, and link 612 can be provided to give more in depth information regarding the proposed sale. The columns of tables 604 and 606 correspond to the columns described above in connection with table 514. The sell section diversification table can also include an alternates row 614 which can provide alternative sales of other assets held in the portfolio to achieve a desired diversification.

Figure 7:
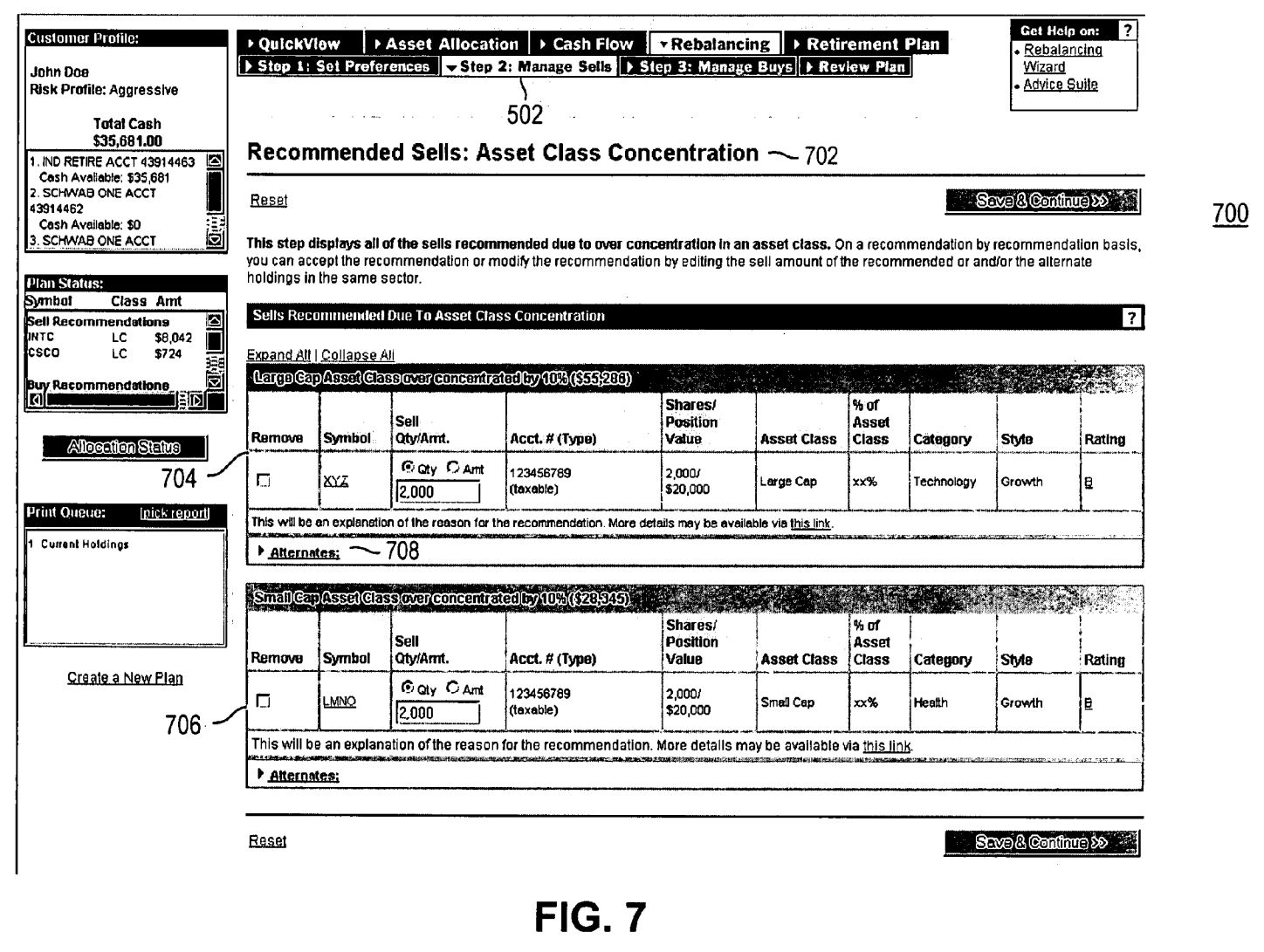

FIG. 7 shows an additional screen shot 700 where the Step 2: Manage Sells field 502 is highlighted. A title field 702 identifies that the sells shown in the tables below 704 and 706 are sells that are proposed to achieve desired asset class diversification. Elements of the asset class sale tables 704 and 706 correspond to the elements described above in connection with FIG. 6.

Figure 8:
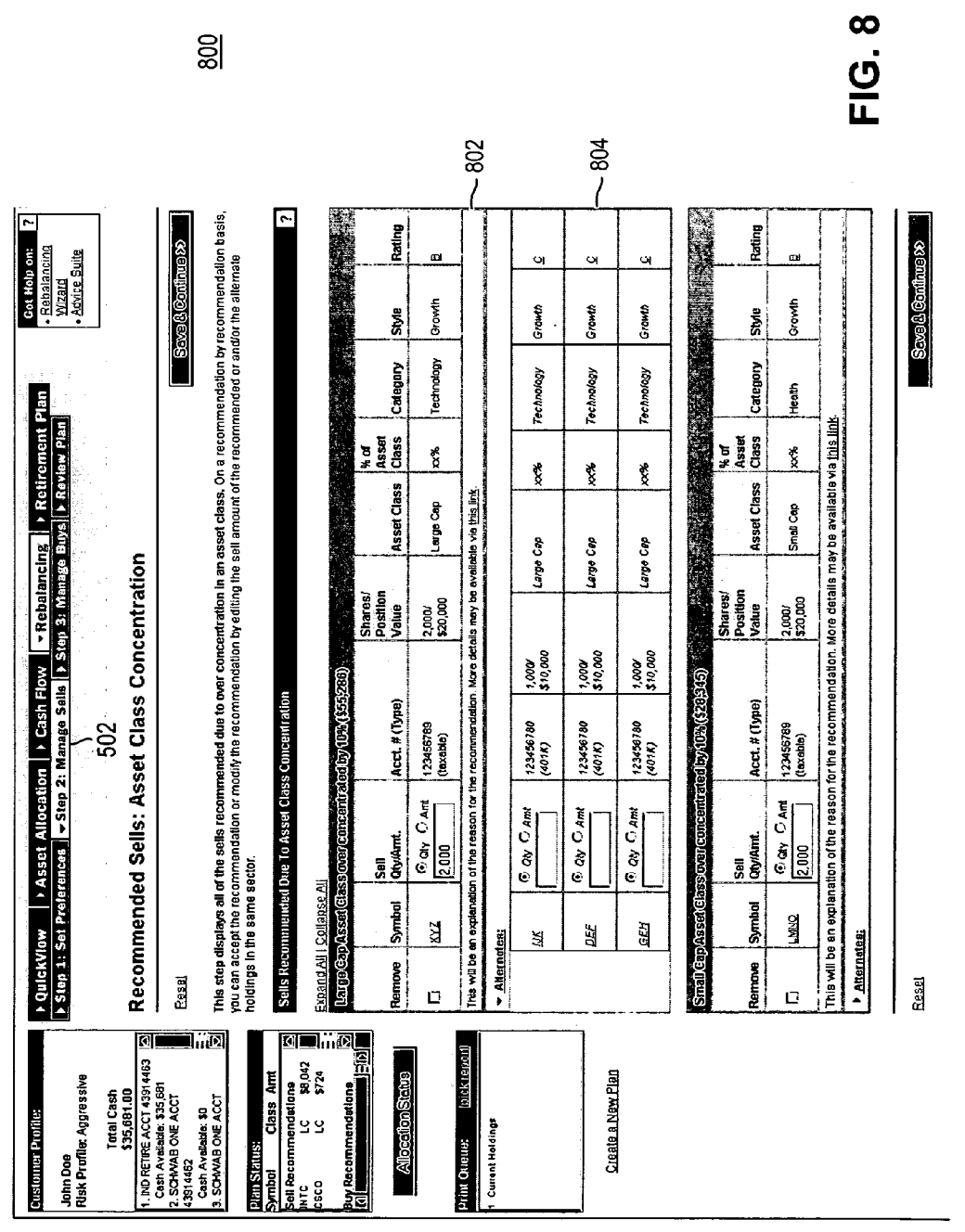

FIG. 8 shows a screen shot 800 which can be displayed when a user clicks on the Alternates field 708 of FIG. 7. As shown in FIG. 800, table 802 shows the recommended sale of security XYZ, and additionally table 802 has been expanded in area 804 to show a listing of additional securities which can be provided as alternative securities to sell instead of security XYZ.

FIG. 9 shows a screen shot 900 where tables 902-908 are shown; these tables include a general subject field 910, which identifies the reason for the proposed sale. As shown in the heading field 914 the screen shot 900 shows summary of recommended sells. The categories for the different columns correspond to the columns previously discussed for the proposed sale tables above. Additionally, an edit column 912 is provided where a user can click on an "edit" field in the column and edit the proposed sale of the corresponding asset. The general subject fields 910, and 916-920 show the general reason for the recommended sales that are identified in the corresponding tables.

Figure 10A:
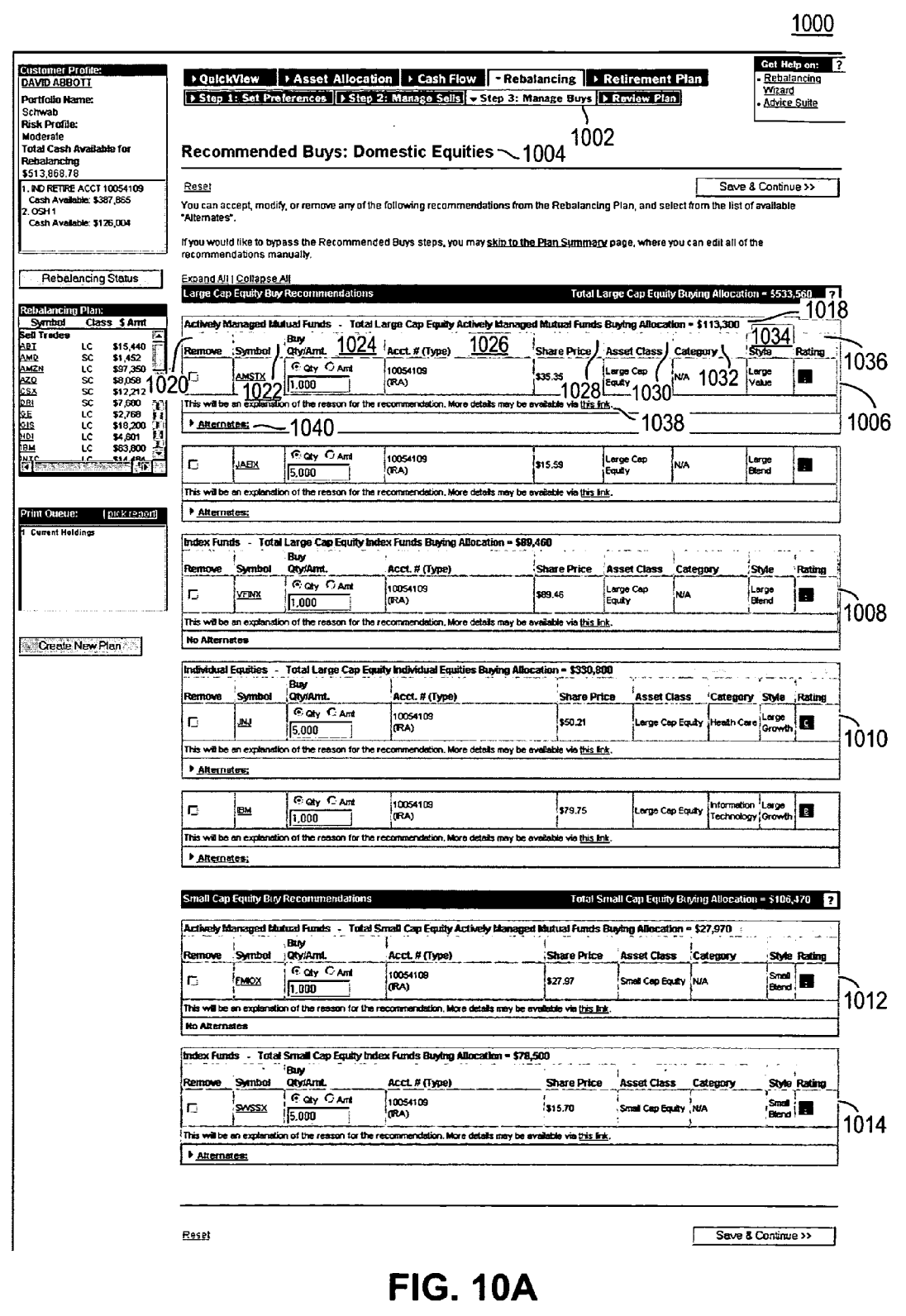

FIG. 10A shows a screen shot 1000 where the Step 3: Manage Buys field 1002 is highlighted. At this point in the process the client preferences would have been entered, and a proposed plan for selling some of the assets held in the portfolio would have been developed. When the Manage Buys field 1002 is highlighted the user can view detailed information regarding proposed buys, and edit the proposal, or remove a recommended buy. A general heading field 1004 identifies the general type of buys which are recommended in the recommended buy tables 1006-1014, which as shown correspond to recommended buys of domestic equities. Elements of domestic equity buy table 1006 are discussed in some detail as follows, and as is shown in the figures, these elements generally correspond to the other buy tables. Table 1006 shows a proposed buy of asset AMSTX, which is an actively managed mutual fund. Each table corresponds to a specific category of proposed buy. A general information row 1018 provides an identification of the type of asset that is proposed for purchase. Further row 1018 identifies the total amount of buying allocated to the type of asset that is proposed for purchase. Remove column 1020 allows a user to click in the remove column and remove the proposed purchase of the corresponding asset from the recommend plan. Symbol column 1022 shows a symbol (for example a ticker symbol) for an asset. Buy Qty/Amt. Column 1024 shows the number of shares, or dollar amount of an asset to be sold. Acct. # (type) 1026 column shows the account and type of account which the asset is held in. Share price column 1028 shows the share price. Asset class column 1030 shows the asset class for the asset that is to be purchased. Category column 1032 shows the category, as described above, that the asset corresponds to. For some assets such as index funds which represent a broad range of sectors, this column might not be applicable. Style column 1034 indicates that type of investment such as growth, value etc. Rating column 1036 represents a rating for the asset.

Information row 1038 provides information that shows the underlying basis for the proposed purchase. Additionally a field can be provided where a user can click on the field to obtain more information regarding the reasons for the proposed purchase. Alternates row 1040 can be provided to give information on other alternative assets that could be purchased instead of the asset identified above in the symbol column 1022, and generally the alternatives would be other investments that are of the same class and category as the above-identified asset. The user could input these alternative assets in place of the asset proposed above.

Figure 10B:
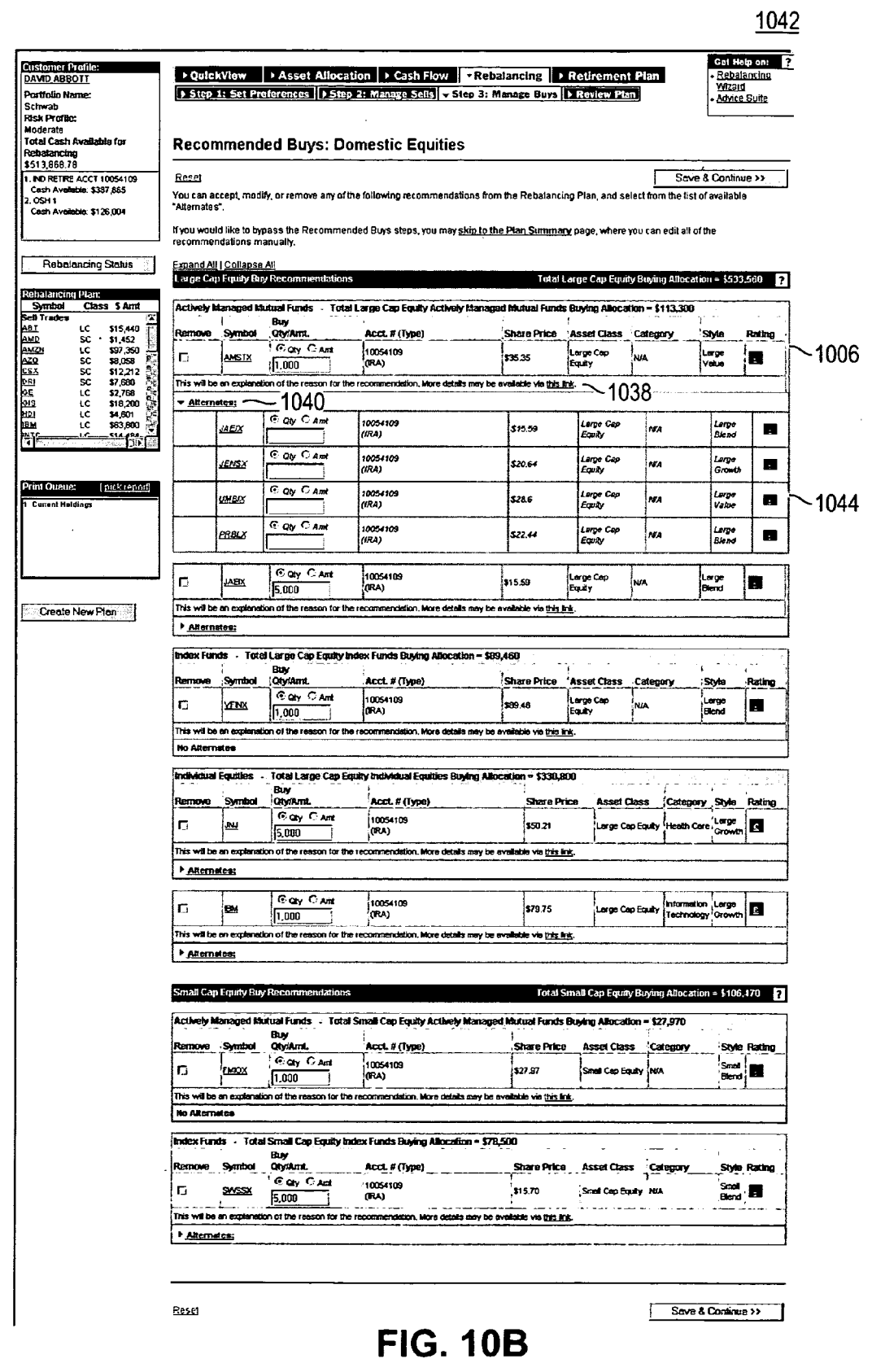

FIG. 10B shows a screen shot 1042 which can be generated when a user selects the Alternates field 1040 shown in FIG. 10A. In response to a user selecting Alternates a list of alternates to the recommended purchase of security AMSTX is shown in an expanded area 1044 of table 1006.

Figure 11:
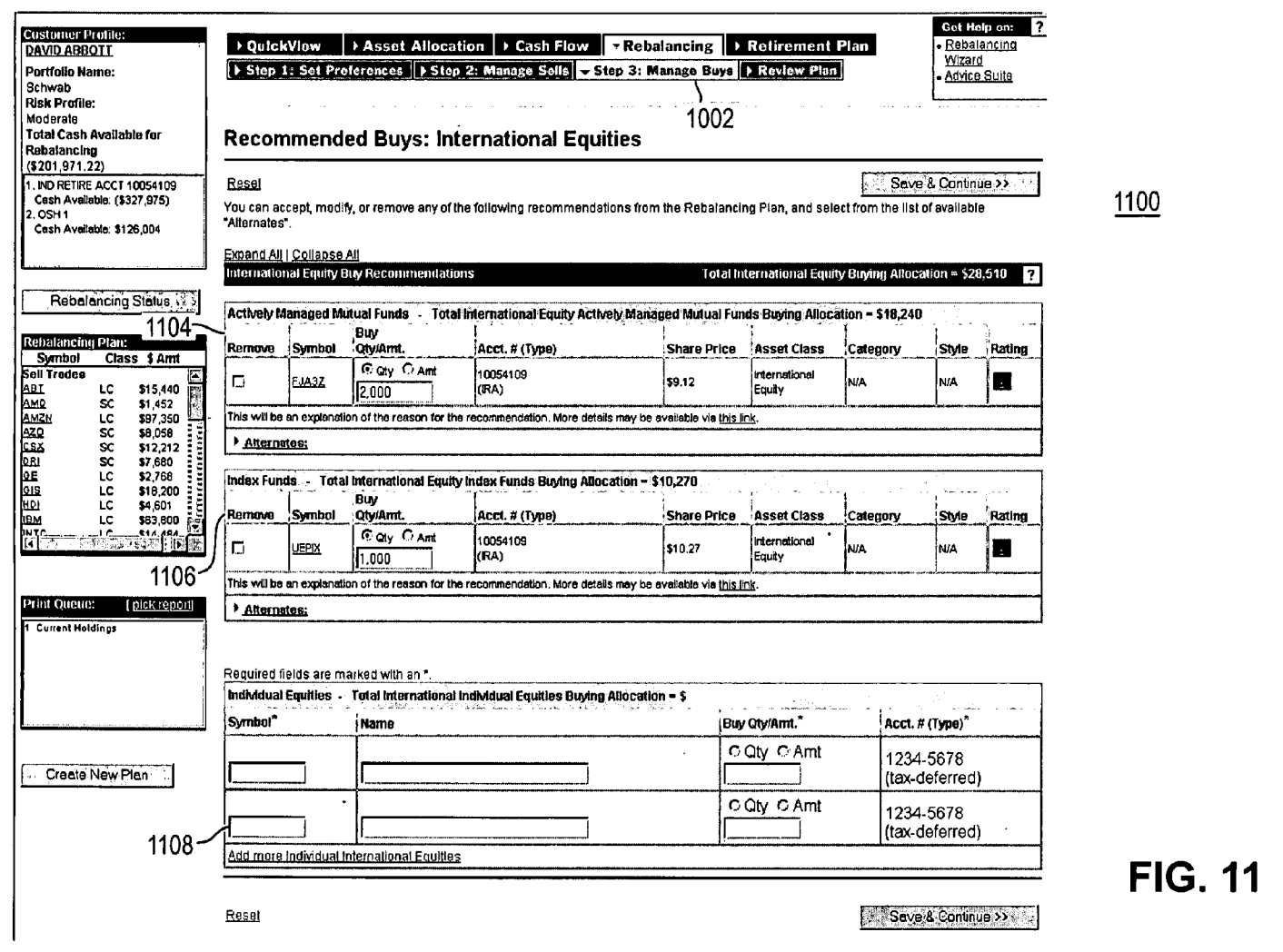

FIG. 11 shows a screen shot 1100 where the Step 3: Manage Buys field 1002 is highlighted. This screen shot shows recommended buy tables 1104 and 1106 for international assets. The elements of tables 1104 and 1106 correspond to the elements discussed above in connection with domestic equity proposed buy table 1006 discussed above. Individual international securities can be selected for purchase in the individual international equities table 1108.

FIG. 12 shows a screen shot 1200, which shows a recommended buy table 1202 for fixed income investments. The elements of these tables correspond to the elements discussed above in connection with domestic equity proposed buy table 1006. Individual fixed income securities can be selected in the individual bonds table 1204.

Once the user has input all of the client preferences and reviewed, and possibly modified the proposed sells and the recommended buys as discussed above the user can then review proposed sells and recommended buys that are generated by the rebalancing engine. It should be noted that the user need not review all of the recommended buy tables and proposed sell tables as discussed above. Rather the user could simply accept the plan recommended by the rebalancing engine, where the rebalancing engine operates to determine the recommended buy and sell plan based on the individual characteristics, and individual preferences.

Figure 13:
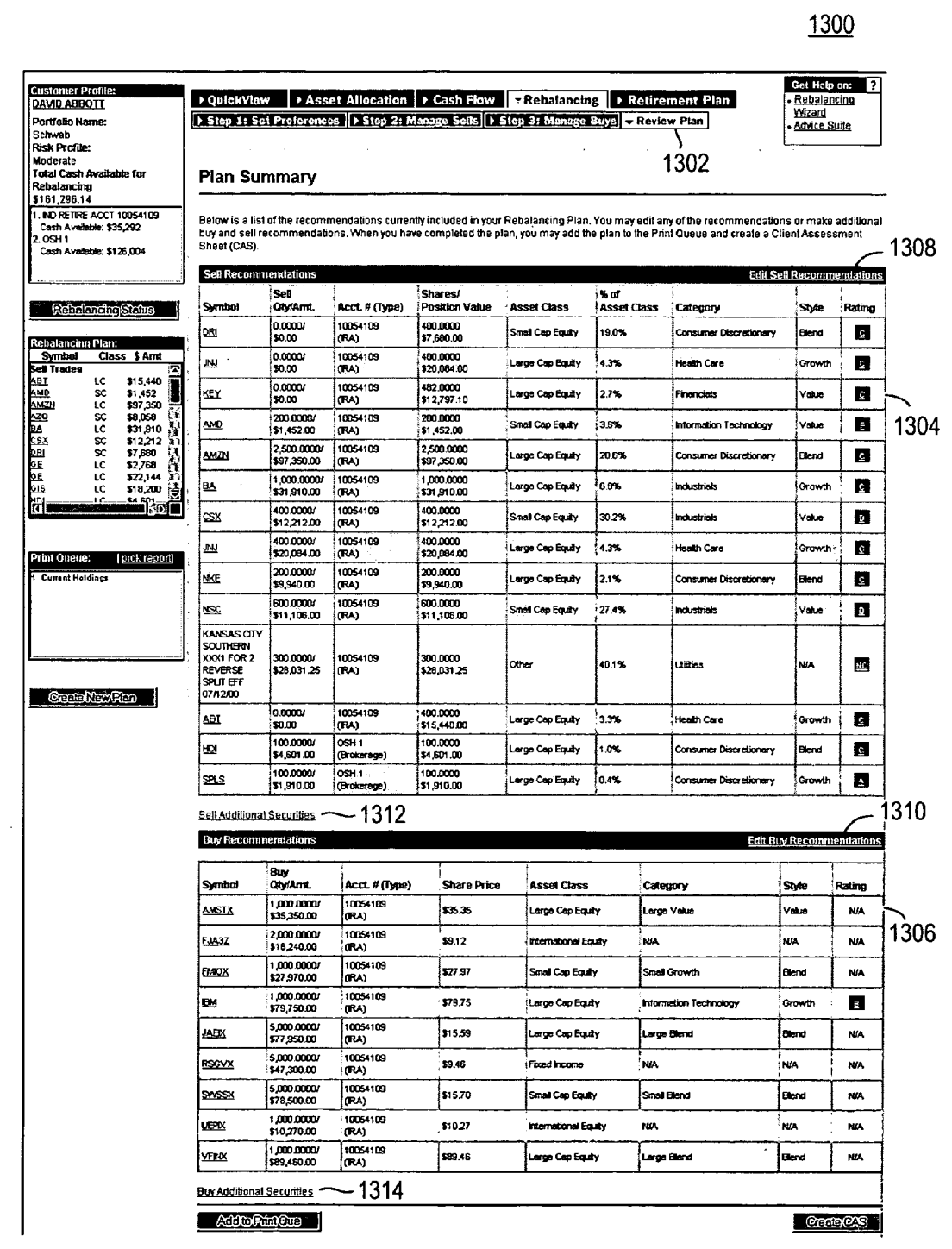

FIG. 13 shows a screen shot 1300, which is displayed when the review plan field 1302 has been selected. Table 1304 shows a summary of all recommended sells. Table 1306 shows a summary of recommended buys. As shown in column headings of table 1304, columns are provided which identify information for securities which are recommended for sale. Table 1304 provides an Edit Sell Recommendation field 1308, which user can select by clicking on the field 1308. Similarly table 1306 provides a field Edit Buy recommendations field 1310 which can be selected by a user. Table 1304 also provides a Sell Additional Securities field 1312, and table 1306 provides Buy Additional Securities field 1314.

Figure 14:
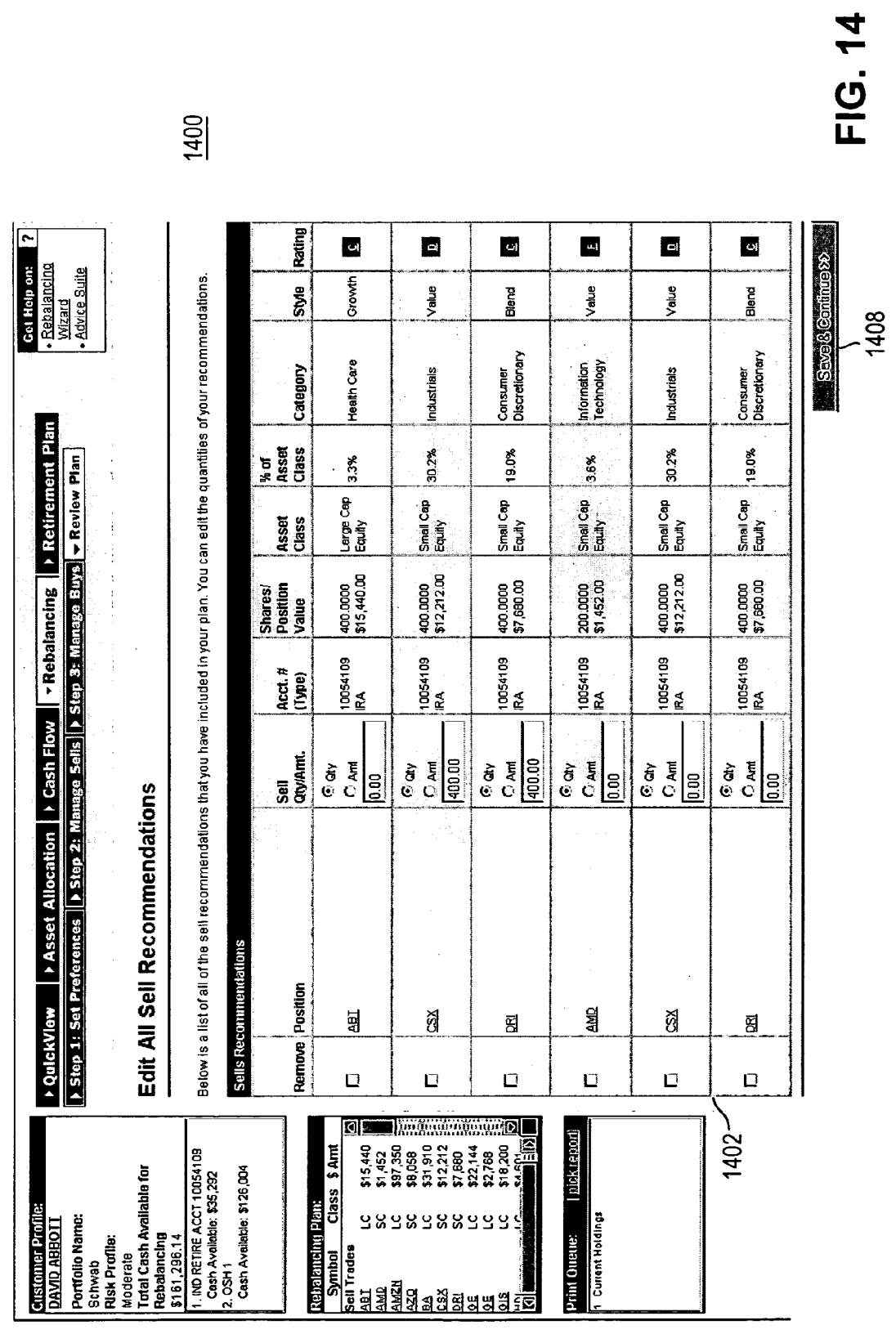

When a user selects the Edit Sell Recommendation field 1308, a new screen shot can be generated shown as 1400 in FIG. 14. The screen shot 1400 provides an edit sell recommendations table 1402 where a user can select to have a recommended sale of particular security removed, or the user can modify the amount of the security which is recommended to be sold. Similarly, when a user selects the Edit Buy Recommendations field 1310, a screen shot 1500 can be generated which shows an edit buy recommendations table 1502 where a user can select to have a recommended purchase of particular security removed, or the user can modify the amount of the security which is recommended to be purchased.

Figure 16:
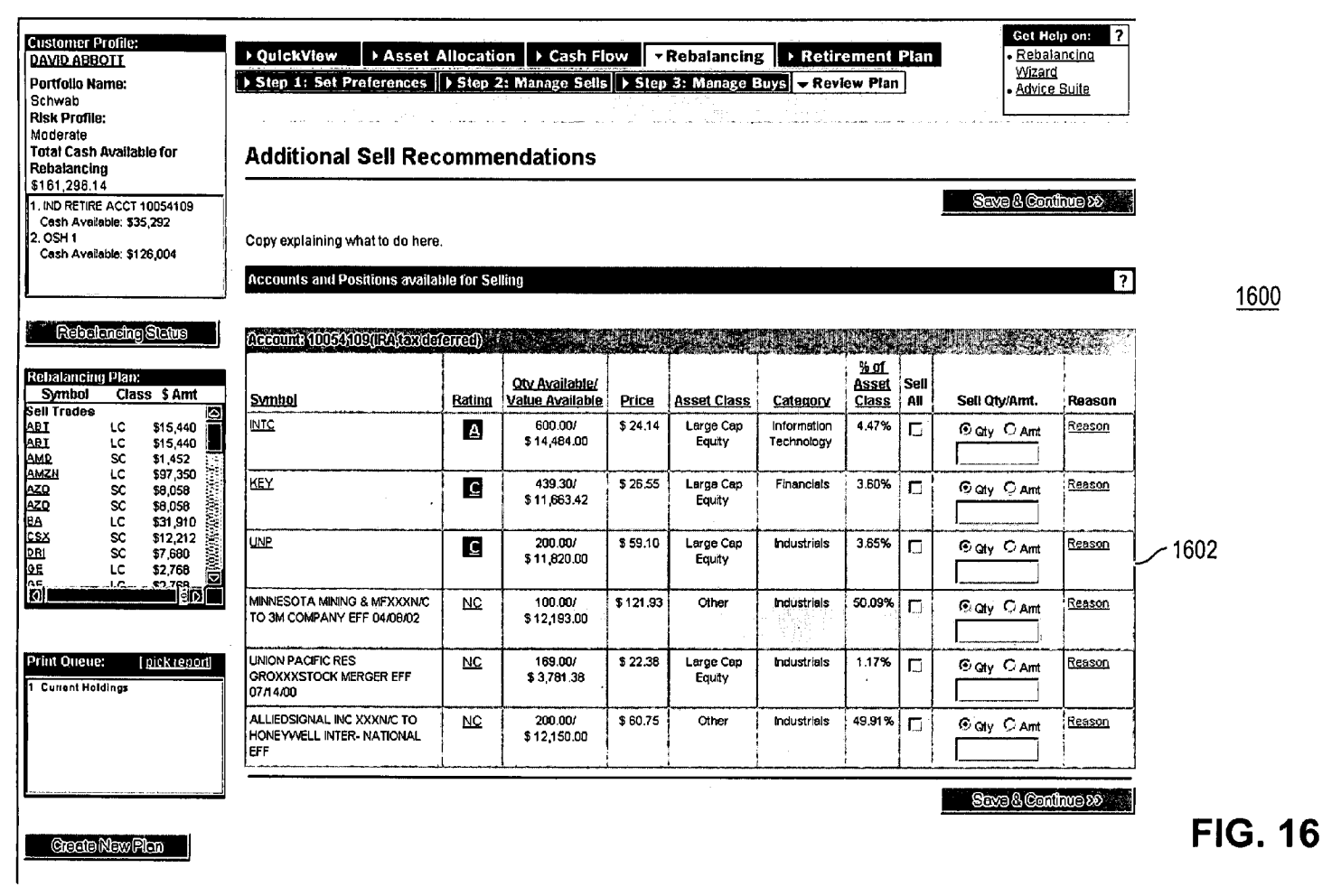

FIG. 16 shows a screen shot 1600 which can be displayed when a user selects the Sell Additional Securities field 1312 as shown in FIG. 13. Table 1602 shows securities which are held in a client's portfolio which are available for sale, if the user believes that client would like to make additional sales.

Figure 17A:
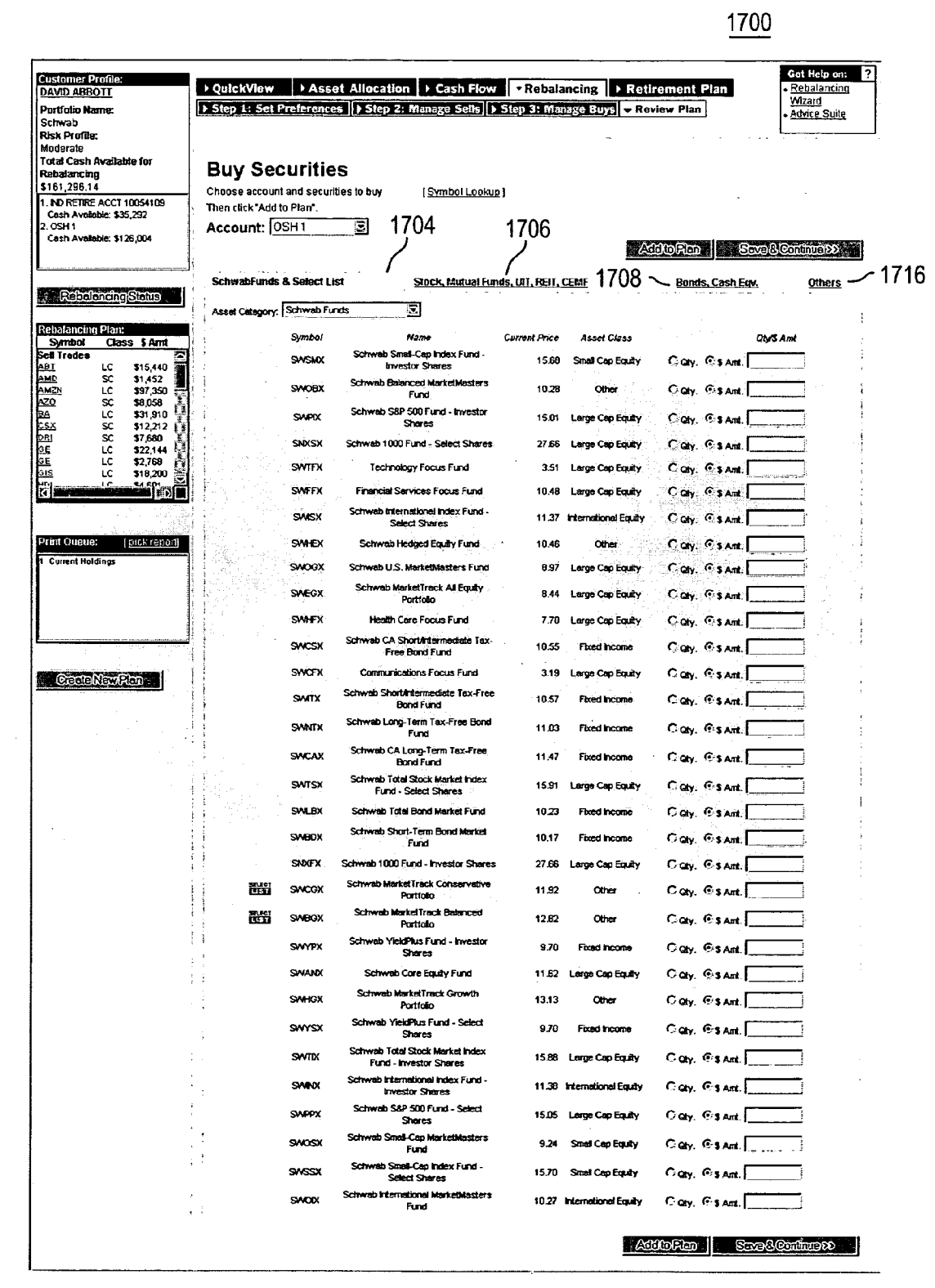
Figure 17B:
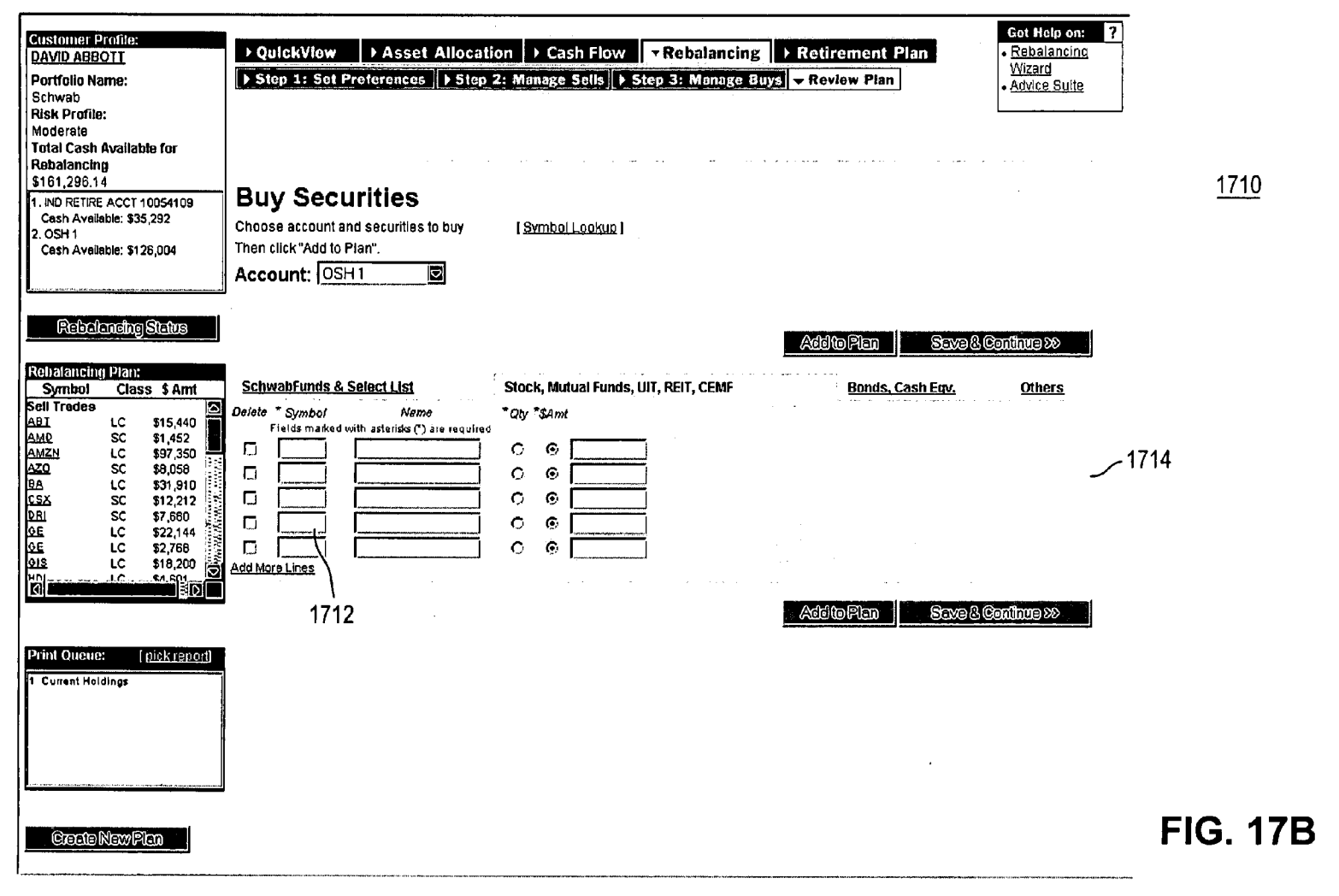

FIGS. 17A-17B correspond to different screen shots which can be displayed in connection with a user selecting the Buy Additional Securities field 1314 shown in FIG. 17.

FIG. 17A shows a screen shot 1700 which displays a selection of different mutual funds. As shown, the selected tab SchwabFunds & Select List 1704 shows that listed funds below are either mutual funds provided by Schwab, or are mutual funds which are on a selected list of highly rated mutual funds. When a user selects the Stock, Mutual Funds, UIT, REIT, CEME field 1706, then a new screen shot 1710 can be generated which provides fields 1712 in a table 1714 where a user can enter symbols and amount for additional securities that would like to be included in the plan as additional recommended sells. Similar tables could also be provided in response to a user selecting on the Bonds, Cash Eqv. field 1708, or the Others field 1716.

Figure 18A:
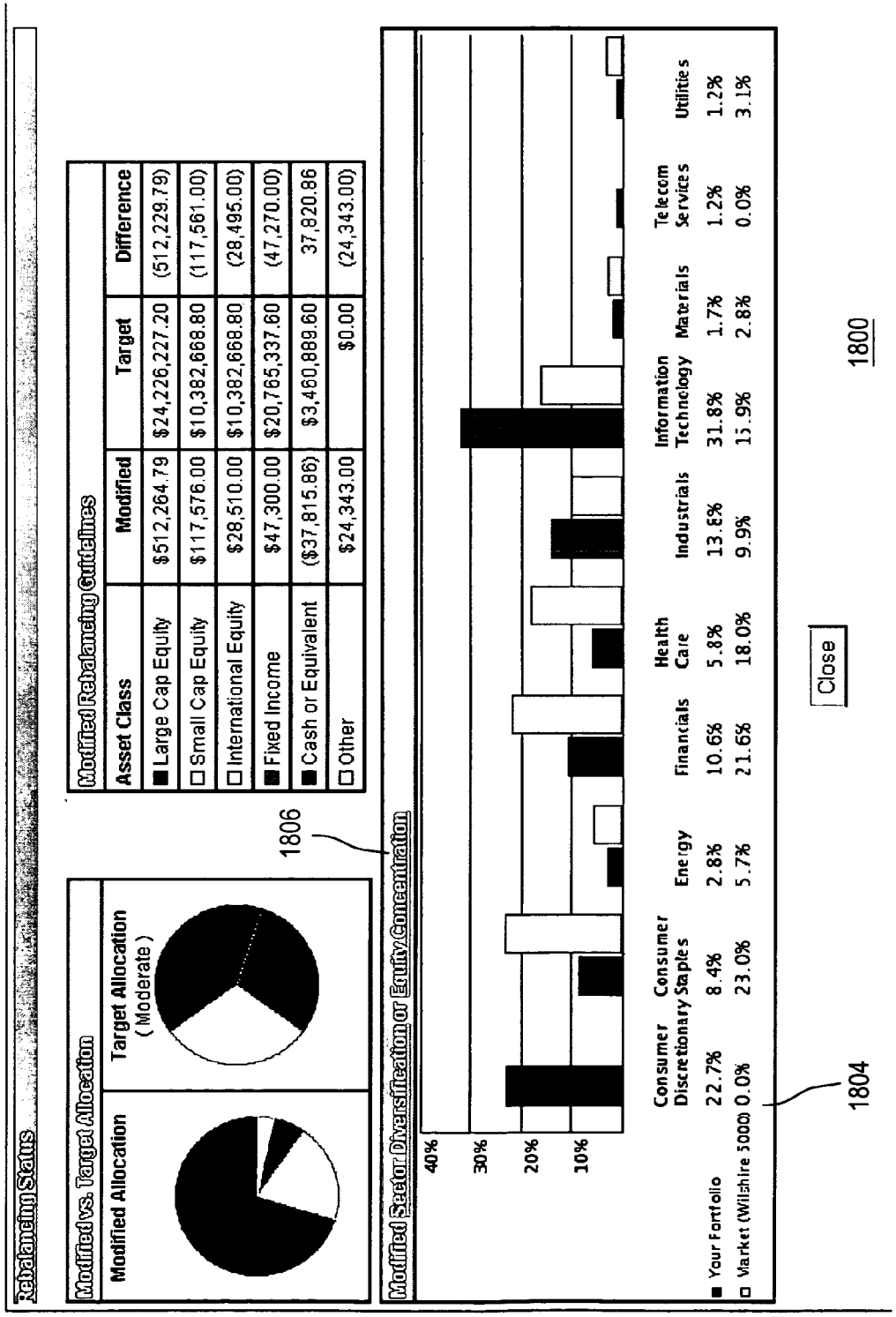
FIGS. 18a-18b are displays tables and graphs showing current recommended rebalancing.
Figure 18B:
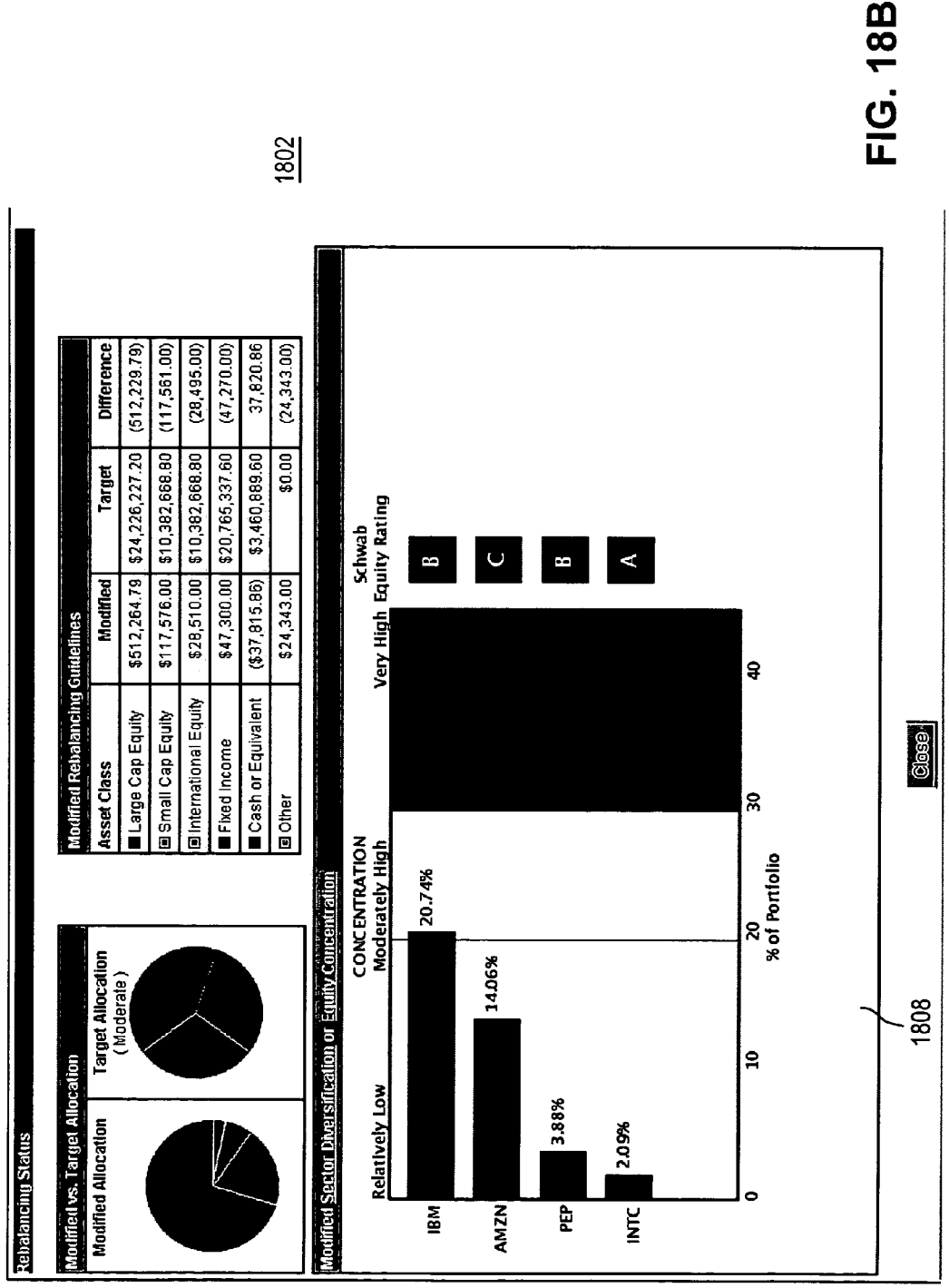

FIGS. 18A-18B shows screen shot 1800 and 1802 which could be shown in one embodiment of the present system in response to a user clicking on an allocation status field, which is shown in many of the above screen shots. For example, in FIG. 3 the allocation status field 307 is provided. The allocation status screen shot 1800, shows the present client portfolio relative to the recommended portfolio, if the client follows the recommended actions. Sector diversification table 1804 shows the client's portfolio sector diversification against the Wilshire 5000. If a user selects the Equity Concentration field 1806, then the sector diversification table 1804 will be replaced with an Equity Concentration table 1808 as shown in FIG. 18B.

Figure 19F:
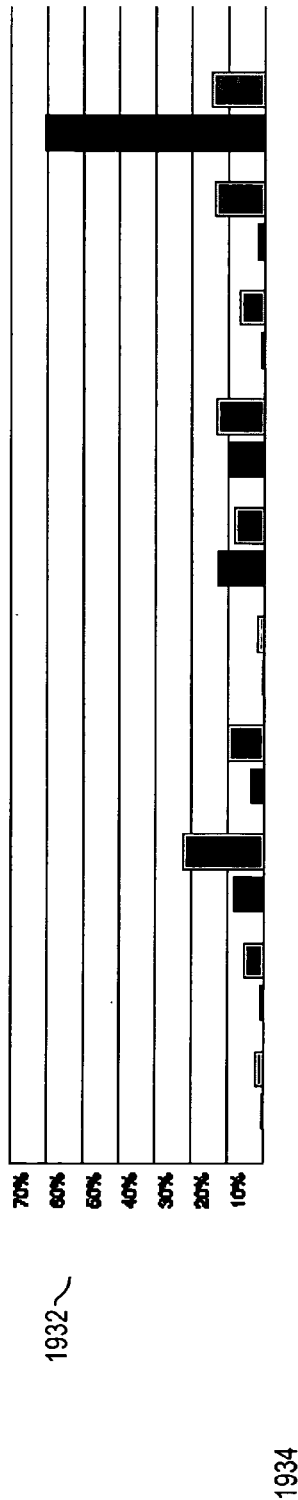

FIGS. 19A-19G show screen shots or pages from a portfolio rebalancing plan 1900 which can be generated by the rebalancing engine at the conclusion of the process illustrated by the previous Figures. FIG. 19A is a page of a rebalancing plan generated by the rebalancing engine. Header field 1901 identifies a client account where sales and purchases of assets are recommended. Table 1902 contains rows and columns that identify specific assets recommended for purchase or sale. Column 1904 identifies the reason for each recommended purchase or sale. Additional screen shots similar to that shown in FIG. 19A could be shown for each account which is included in the rebalancing plan.

FIG. 19B is a page of the rebalancing plan that includes a current allocation pie chart 1906, which shows a current asset allocation for a client portfolio, prior to implementing the recommended sales and purchases. Rebalanced allocation pie chart 1908 shows the asset allocation for the portfolio, after the client has implemented the recommended sales and purchases. Table 1910 shows a table which identifies current asset allocation, and the rebalanced asset allocation and adjustments needed to go from the current asset allocation to the rebalanced asset allocation.

FIGS. 19C-19D include tables 1912-1924, which identify assets that will be held in the portfolio if the client follows the recommended buys and sells. Each table includes a header field that identifies the types of assets included in each of the fields, and the percentage of the total portfolio made up of the corresponding asset type. As shown tables 1912-1924 correspond to asset types Large Cap, Small Cap, International, Fixed Income, Cash or Equivalent, and Other respectively. Assets identified in the Other table will typically be assets that do not fit directly into one of the other asset class types.

FIG. 19E shows client preferences that were taken into account in generating the rebalancing plan. Asset allocation preferences table 1926 shows a client's preferred asset allocation relative to the model allocation that would be suitable given a particular client's characteristics. As shown in table 1926 the particular model allocation determined to be suitable for the particular client was a moderately aggressive allocation plan. Sector allocation preferences table 1928 shows a client's preferred sector allocation relative to a sector allocation as determined by the Wilshire 5000 sector allocation. As in table 1928 the client preferences are consistent with the sector allocation of the Wilshire 5000.

Account and Position Preferences table 1930 shows client preferences with respect to specific client account. For example, a client preference is shown for no trades in account #1234-5678, and specific assets in other accounts have specific reasons associated with action for the particular actions relative to the asset.

FIG. 19F shows a rebalanced sector diversification graph 1932 and table 1934. The information shown compare the rebalance sector diversification against the market sector diversification as determined by the Wilshire 5000.

Figure 19G:
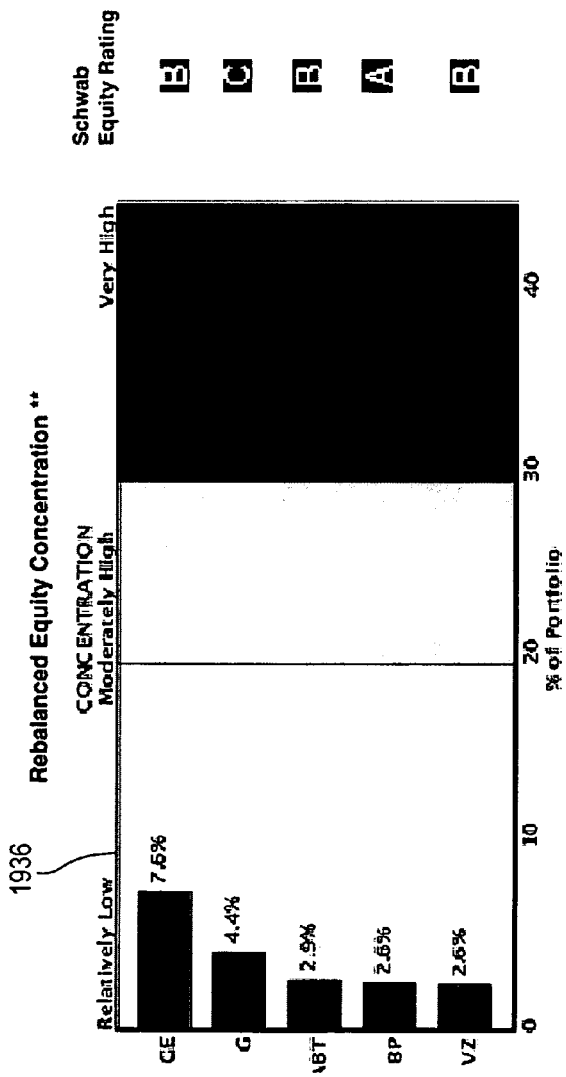

FIG. 19G shows a rebalanced equity concentration table 1936. As shown a rebalanced portfolio would ideally have no single equity position which represents more than 20% of the portfolio.

It should be recognized that a number of variations of the above-described embodiments would be obvious to one of skill in the art. Accordingly, although specific embodiments and methods of the present invention are shown and described herein, this invention is not to be limited by these specific embodiments. Rather, the scope of the invention is to be defined by the following claims and their equivalents.

What is claimed is:

1. In a financial advisory computer system, a method for providing financial advice, the method including:
   receiving a risk tolerance for a client;
   receiving preferences for the client wherein the preferences for the client include an identification of specific assets that the client wants to sell or hold;
   identifying assets held in the client's portfolio;
   based on the preferences and the risk tolerance for the client, determining, via a server computer, a recommended asset allocation;
   providing a database with ratings for different financial assets;
   Identifying one or more assets in the client's portfolio that are recommended to be sold;
   for each asset of the one or more identified assets recommended to be sold, generating a list of alternative client portfolio assets recommended to be sold instead of the identified asset;
   wherein an asset is recommended to be sold based on one of the following criteria: (1) the asset is recommended to be sold to achieve the recommended asset allocation, (2) the asset is recommended to be sold based on the specific client preferences, (3) the asset is recommended to be sold in order to achieve sector diversification, (4) the asset is recommended to be sold based on a poor rating for the asset in the database, (5) the asset is recommended to be sold in order to reduce concentration in the asset, or (6) the asset is recommended to be sold to realize tax loss harvesting;
   generating a plurality of tables wherein each asset of the one or more identified assets recommended to be sold is included in one of the tables, wherein each table corresponds to a reason that identifies the basis for recommending that assets contained in the table be sold, wherein the plurality of tables includes a first table that lists assets to be sold to achieve a recommended asset allocation and a second table that lists assets to be sold due to poor ratings, and wherein the basis correlates to an investment strategy for the client's portfolio;
   receiving account numbers for a plurality of investment accounts the client has at a particular financial institution;
   receiving additional preferences wherein the additional preferences include which of the plurality of accounts are to be included in financial advisory considerations;
   identifying assets held in the client's portfolio wherein the portfolio includes assets spread across the included accounts; and
   recommending placing assets into the included accounts in a tax efficient manner, wherein the tax efficient manner comprises selecting assets with least tax efficiency for purchase in the included accounts that are most tax advantaged.

2. The method of claim 1,
   wherein each table contains one or more rows and a plurality of columns, and at least one of the columns indicates a rating from the database wherein the rating corresponds to the asset that corresponds to the row where the rating is provided.

3. The method of claim 1 wherein determining a recommended asset allocation is further based on an underlying target asset allocation corresponding to model portfolios constructed via means-variance optimization.

4. The method of claim 1 wherein the plurality of tables further includes a third table that lists assets to be sold based on a specific client preference.

5. The method of claim 4 wherein the plurality of tables further includes a fourth table that lists assets to be sold in order to achieve sector diversification.

6. The method of claim 5 wherein the plurality of tables further includes a fifth table that lists assets to be sold in order to reduce concentration in the asset.

7. The method of claim 6 wherein the plurality of tables further includes a sixth table that lists assets to be sold to realize tax loss harvesting.

8. The method of claim 7 wherein determining a recommended asset allocation is further based on an underlying target asset allocation corresponding to model portfolios constructed via means-variance optimization.

9. The method of claim 1 wherein determining a recommended asset allocation is performed by the computer system.

10. The method of claim 1 further comprising:
    displaying, in each table, columns respectively including a symbol, a quantity to sell, an account number and account type, shares and position value, asset class, and rating.

11. The method of claim 10 wherein the account number and account type column lists taxable and non-taxable accounts.

12. The method of claim 1, wherein the tax efficient manner further comprises selecting assets based on client's tax rate for purchase in the included accounts that are most tax advantaged.

13. The method of claim 1,
    wherein the plurality of tables further includes one or more rows which correspond to the one or more identified assets recommended to be sold.

14. The method of claim 13,
    wherein each row that corresponds to the one or more identified assets recommended to be sold provides an edit field where the client can select the edit field;
    in response to the client selecting an edit field in a first row corresponding a first identified asset to be sold, display a group of recommended alternative assets that can be sold in place of the first identified asset.

15. The method of claim 1, wherein the plurality of tables further provides a field which allows the client to obtain more information regarding the basis for recommending that the one or more identified assets in the table be sold.

16. The method of claim 1, wherein the database provides ratings for different mutual funds.

* * * * *